US008203675B2

(12) United States Patent
Yanai et al.

(10) Patent No.: US 8,203,675 B2
(45) Date of Patent: Jun. 19, 2012

(54) LIQUID-CRYSTAL DISPLAY DEVICE HAVING RETARDATION FILMS WITH DIFFERENT OPTICAL ANISOTROPY

(75) Inventors: Yujiro Yanai, Minami-ashigara (JP); Hirofumi Toyama, Minami-ashigara (JP); Hajime Nakayama, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 647 days.

(21) Appl. No.: 12/370,731

(22) Filed: Feb. 13, 2009

(65) Prior Publication Data

US 2009/0207355 A1 Aug. 20, 2009

(30) Foreign Application Priority Data

Feb. 20, 2008 (JP) ................................ 2008-039255

(51) Int. Cl.
*G02F 1/1335* (2006.01)

(52) U.S. Cl. ........ 349/117; 349/118; 349/119; 349/120; 349/121

(58) Field of Classification Search .......... 349/117–121, 349/96, 105
See application file for complete search history.

(56) References Cited

U.S. PATENT DOCUMENTS 6,028,651 A * 2/2000 Abileah et al. ................ 349/123
7,057,684 B2 * 6/2006 Ishihara et al. ............... 349/107
7,646,457 B2 * 1/2010 Fukagawa et al. ........... 349/122
2004/0239852 A1 12/2004 Ono et al.
2008/0198303 A1 * 8/2008 Taguchi .......................... 349/96

FOREIGN PATENT DOCUMENTS

JP 2000131693 * 5/2000
JP 2000-131693 12/2000
JP 3330574 * 9/2002
JP 3648240 B2 2/2005
JP 2005219444 * 8/2005

* cited by examiner

*Primary Examiner* — Hoan C Nguyen
(74) *Attorney, Agent, or Firm* — Buchanan Ingersoll & Rooney PC

(57) ABSTRACT

A liquid-crystal display device comprising a liquid-crystal cell having a liquid-crystal layer that aligns vertically to the substrate thereof in the black state, first and second polarizing elements that are disposed to sandwich the liquid-crystal cell therebetween in a manner that their absorption axes are perpendicular to each other, an optically-biaxial retardation film A disposed between the first polarizing element and the liquid-crystal cell, and an optically-biaxial retardation film B disposed between the second polarizing element and the liquid-crystal cell, wherein the retardation films A and B differ from each other in the optical anisotropy, is disclosed.

16 Claims, 7 Drawing Sheets

Passing through
Rear-Side Retardation Film B

Passing through
VA Cell

Passing through
Front-Side Retardation Film A

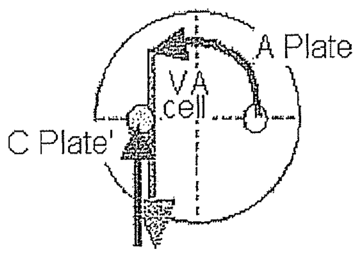
Fig. 10A
| |
|---|
| Protective Film |
| Polarizing Element |
| C Plate' |
| VA-cell (different $\Delta$nd) |
| A Plate |
| Polarizing Element |
| Protective Film |
Fig. 10B
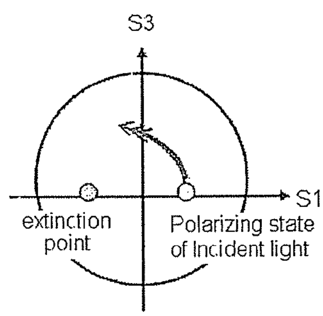
Passing through
Rear-Side Retardation Film X
Fig. 11A
("homo-type")
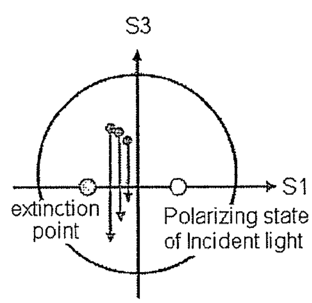
Passing through
VA Cell
Fig 11B
("homo-type")
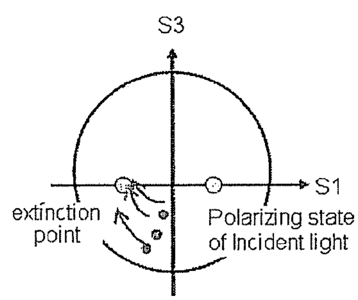
Passing through
Front-Side Retardation Film X
Fig 11C
("homo-type")

Passing through A Plate ("C Plate + A Plate -type")

Passing through VA Cell ("C Plate + A Plate -type")

Passing through C Plate ("C Plate + A Plate -type")

LIQUID-CRYSTAL DISPLAY DEVICE HAVING RETARDATION FILMS WITH DIFFERENT OPTICAL ANISOTROPY

CROSS-REFERENCE TO RELATED APPLICATIONS

This application claims benefit of priority under 35 U.S.C. 119 to Japanese Patent Application No. 2008-039255 filed on Feb. 20, 2008, which is expressly incorporated herein by reference in its entirety.

BACKGROUND OF THE INVENTION

1. Technical Field

The present invention relates to a liquid-crystal display device comprising a polarizing plate and a retardation film, and in particular to a VA (vertical alignment)-mode liquid-crystal display device.

2. Background Art

It is known that a VA-mode liquid-crystal display device can realize a wide viewing angle, or that is, can have improved display characteristics, as comprising polarizing plates each disposed on and below a liquid-crystal cell with their absorption axes crossing vertically to each other, and having an optically biaxial retardation film disposed between each polarizing plate and the liquid-crystal cell (for example, Japanese Patent 3330574).

FIG. 7B shows a cross section of a liquid-crystal display device in which the above-mentioned, optically-biaxial retardation films having the same optical anisotropy are used on and below a VA-cell; and FIG. 7A shows the polarization state of the light that passes through the layers of the device, as arrows on a Poincare sphere. In this system, a film of the same type may be disposed on and below the VA cell to enable optical compensation, therefore having the advantage in that the mass-scale production cost is reduced. However, in this system, in case where Δnd of the liquid-crystal cell changes, it is necessary to re-plan the optimum retardation in plane Re and retardation along thickness direction Rth of the biaxial retardation films every time with the change (for example, as shown in FIGS. 8A and 8B, it is necessary to replace Retardation Film X with Retardation Film X' having different optical characteristics). Variously changing Δnd of the liquid-crystal cell is under investigation for the purpose of power saving and rapid response; and trying to compensate the system employing such a different liquid crystal cell by two retardation films having the same optical anisotropy, it is necessary to re-plan the optimum optical characteristics of the retardation films for each of liquid-crystal cells having a different value of Δnd, and it is also necessary to re-plan the production line.

On the other hand, a system has been proposed for reducing the light leakage depending on the variation of wavelength of light, or that is, for reducing the color shift in undesirable coloration in blue or red, which is observed in the oblique directions in the black state of liquid-crystal display devices. In the proposed system, used are two retardation films, concretely, an optically-positive monoaxial film (generally A plate) and an optically-negative monoaxial film (generally C plate), having a specific wavelength dispersion characteristics of retardation (for example, Japanese Patent 3648240). FIG. 9B shows a cross section of a liquid-crystal display device of a combination of A plate and C plate; and FIG. 9A shows the polarization state of the light that passes through the layers, as arrows on a Poincare sphere. In this system, it is unnecessary to change the optical characteristics of the A plate for optical compensation of the liquid-crystal cell of which the Δnd may change variously; and in this, only changing the optical characteristics of the C plate may be enough to satisfy the condition of the changing Δnd of the liquid-crystal cell (for example, as shown in FIGS. 10A and 10B, it is necessary to replace C plate with other C plate, C plate', having different optical characteristics, but it is not necessary to replace A plate with other A plate). However, this system requires polarization change with the A plate to the vertical line that passes through the extinction point P, and for achieving such a polarization change, it is necessary to use the A plate having large Re and Rth. However, it is not easy to produce A plates having such optical characteristics. It is not also easy to produce on an industrial scale a film satisfying the optical characteristics required for C plate (in a precise sense thereof, its retardation in plane (Re) is zero and its Rth is large). This is because, in industrial-scale continuous production of films, in general, the produced films may have some Re in the machine (or transversal) direction. Such films having some Re are, in a precise sense thereof, optically biaxial films.

SUMMARY OF THE INVENTION

An object of the invention is to improve the performance of liquid-crystal display devices so as to satisfy the recent requirement in the art for liquid-crystal display devices having more improved display quality, concretely, to realize a high-contrast in a wide viewing angle. Recently, in addition, cost reduction in producing liquid-crystal display devices is much desired in the art; and for satisfying the requirement, another object of the invention is to propose a novel optical compensation system over the above-mentioned ordinary optical compensations system and to reduce the production cost of retardation films as optical components of liquid-crystal display devices, therefore realizing easy production of liquid-crystal display devices.

For solving the above mentioned problems, the present inventors conducted various studies regarding the two systems mentioned above, and as a result, they found that, by employing two optically-biaxial films, retardation films A and B, disposed on and below a liquid crystal cell, being different from each other in terms of optical anisotropy, it is possible to provide a novel system, referred to as "hetero"-system because it employs two optically-biaxial films of which optically anisotropy is different from each other (on the other hand, the above mentioned system shown in FIGS. 7A and 7B, referred to as "homo"-system because it employs two optically-biaxial films of which optically anisotropy is same), which is a system intermediate between the systems shown in FIGS. 7A-7B and 9A-9B respectively; and they also found that a VA-mode liquid crystal display device, employing the "hetero"-system, has a high viewing-angle contrast. One example of a mechanism for compensation of the liquid crystal display device is shown in FIGS. 4A-4B, and its details will be described hereinafter. According to the "hetero"-system, the variation of a liquid crystal cell on terms of Δnd can be handled by replacing only one of two retardation films, for example retardation film A, with other film without replacing another, retardation film B; and therefore the present invention is preferable in terms of productivity of retardation films and liquid crystal display devices.

The means for achieving the objects are as follows.

[1] A liquid-crystal display device comprising:

a liquid-crystal cell having a liquid-crystal layer that aligns vertically to the substrate thereof in the black state, first and second polarizing elements that are disposed to sandwich the liquid-crystal cell therebetween in a manner that their absorption axes are perpendicular to each other, an optically-biaxial retardation film A disposed between the first polarizing element and the liquid-crystal cell, and an optically-biaxial retardation film B disposed between the second polarizing element and the liquid-crystal cell, wherein the retardation films A and B differ from each other in the optical an isotropy.

[2] The liquid-crystal display device as set forth in [1], wherein the retardation film A satisfies the following conditions (I) and (II), and the retardation film B satisfies the following conditions (III) and (IV):

$$20 \leqq Re_{(A)}(548) \leqq 65 \quad \text{(I)}$$

$$50 \leqq Rth_{(A)}(548) \leqq -2.5 \times Re_{(A)}(548) + 300 \quad \text{(II)}$$

$$45 \leqq Re_{(B)}(548) \leqq 110 \quad \text{(III)}$$

$$50 \leqq Rth_{(B)}(548) \leqq -2.5 \times Re_{(B)}(548) + 325 \quad \text{(IV)}$$

wherein $Re_{(A)}(\lambda)$ [nm] means retardation in plane of the retardation film A measured at a wavelength of λ [nm]; $Rth_{(A)}(\lambda)$ [nm] means retardation along thickness direction of the retardation film A measured at a wavelength of λ [nm]; and similarly, $Re_{(B)}(\lambda)$ [nm] and $Rth_{(B)}(\lambda)$ [nm] each mean retardation in plane and retardation along thickness direction of the retardation film B measured at a wavelength of λ [nm].

[3] The liquid-crystal display device as set forth in [1] or [2], wherein the retardation film A and the retardation film B satisfy the following conditions (V) and (VI):

$$Re_{(A)}(446) - Re_{(A)}(548) > Re_{(B)}(446) - Re_{(B)}(548) \quad \text{(V)}$$

$$Rth_{(A)}(446) - Rth_{(A)}(548) > Rth_{(B)}(446) - Rth_{(B)}(548). \quad \text{(VI)}$$

[4] The liquid-crystal display device as set froth in [3], wherein the retardation film A and the retardation film B satisfy the following conditions (VII) and (VIII):

$$Re_{(A)}(446) - Re_{(A)}(548) > 0 > Re_{(B)}(446) - Re_{(B)}(548) \quad \text{(VII)}$$

$$Rth_{(A)}(446) - Rth_{(A)}(548) > 0 > Rth_{(B)}(446) - Rth_{(B)}(548). \quad \text{(VIII)}$$

[5] The liquid-crystal display device as set forth in any one of [1] to [4], wherein at least one of the retardation films A and B is a cycloolefin-based polymer film.

[6] The liquid-crystal display device as set forth in any one of [1] to [5], wherein at least one of the retardation films A and B is a cellulose acylate film.

[7] The liquid-crystal display device as set forth in [6], wherein the cellulose acylate film comprises a cellulose acylate having at least one acyl group selected from an acetyl group, a propionyl group and a butyryl group.

[8] The liquid-crystal display device as set forth in [6], wherein the cellulose acylate film comprises a cellulose acylate having at least two acyl groups selected from an acetyl group, a propionyl group and a butyryl group.

[9] The liquid-crystal display device as set forth in any one of [6] to [8], wherein the cellulose acylate film comprises at least one discotic compound having an absorption peak at a wavelength falling within the range from 250 nm to 380 nm.

[10] The liquid-crystal display device as set forth in any one of [6] to [9], wherein the cellulose acylate film comprises at least one liquid crystal compound.

[11] The liquid-crystal display device as set forth in [10], wherein said at least one liquid crystal compound is a compound represented by formula (A):

Formula (A)

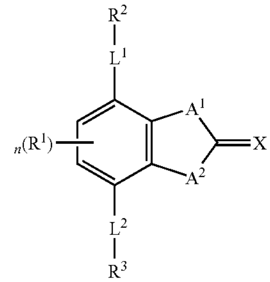

where $L^1$ and $L^2$ independently represent a single bond or a divalent linking group; $A^1$ and $A^2$ independently represent a group selected from the group consisting of —O—, —NR— where R represents a hydrogen atom or a substituent, —S— and —CO—; $R^1$, $R^2$ and $R^3$ independently represent a substituent; X represents a nonmetal atom selected from the groups 14-16 atoms, provided that X may bind with at least one hydrogen atom or substituent; and n is an integer from 0 to 2.

[12] The liquid-crystal display device as set forth in [10], wherein said at least one liquid crystal compound is a compound represented by formula (a):

$$Ar^1\text{-}L^2\text{-}X\text{-}L^3\text{-}Ar^2 \quad \text{Formula (a):}$$

where $A^1$ and $Ar^2$ independently represent an aromatic group; $L^2$ and $L^3$ independently represent —O—CO— or —CO—O—; and X represents 1,4-cyclohexylen, vinylene or ethynylene.

[13] The liquid-crystal display device as set forth in any one of [1] to [12], wherein the thickness of the retardation films A and B is from 30 to 100 μm each.

[14] The liquid-crystal display device as set forth in [1] to [13], wherein at least one of the retardation films A and B is a stretched film.

[15] The liquid-crystal display device as set forth in any one of [1] to [14], wherein the retardation films A is a cycloolefin-based polymer film; and the retardation film B is a cellulose acylate film comprising at least one liquid crystal compound.

[16] The liquid-crystal display device as set forth in any one of [1] to [14], wherein the retardation films A is a cellulose acylate film comprising at least one discotic compound having an absorption peak at a wavelength falling within the range from 250 nm to 380 nm; and the retardation film B is a cellulose acylate film comprising at least one liquid crystal compound.

[17] The liquid-crystal display device as set forth in any one of [2] to [16], wherein the first polarizing element is disposed on the displaying side; and the second polarizing element is on the backlight side.

BRIEF DESCRIPTION OF THE DRAWINGS

FIG. 10B is a schematic cross-sectional view of a conventional VA-mode liquid-crystal display device, and FIG. 10A is a schematic view of one example of an optical compensation system in the device.

FIGS. 11A-11C are views for explaining the optical compensation in a conventional VA-mode liquid-crystal display device (homo system).

Figure 1:
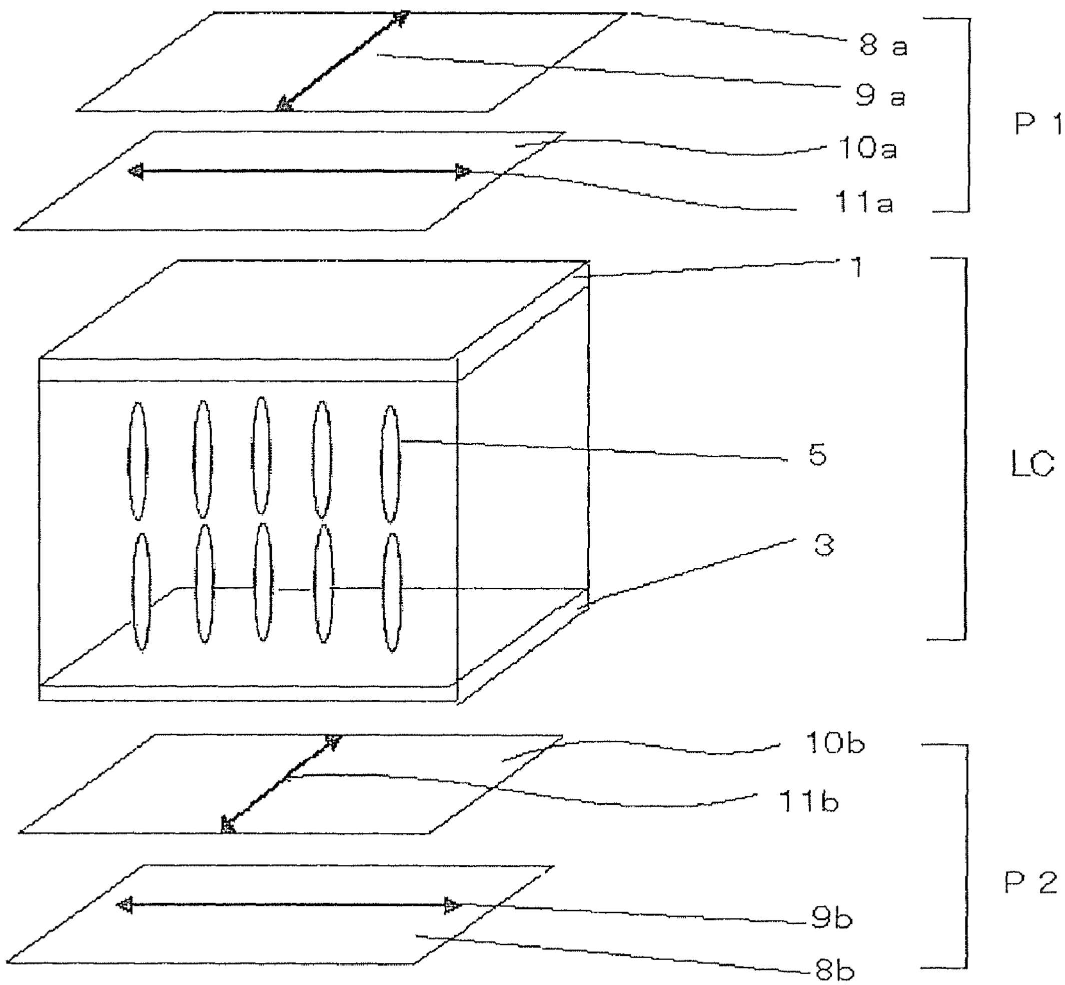
FIG. 1 is a schematic outline view of one example of a liquid-crystal display device of the invention.

In the drawings, the reference numerals have the following meanings:

1 Upper substrate of liquid-crystal cell
3 Lower substrate of liquid-crystal cell
5 Liquid-crystal layer (liquid-crystal molecules)
8_a_, 8_b_ Polarizing films
9_a_, 9_b_ Absorption axes of polarizing films
10_a_, 10_b_ Retardation films
P1, P2 Polarizing plates
LC Liquid-crystal cell

DETAILED DESCRIPTION OF THE INVENTION

The invention is described in detail hereinunder. In this description, the numerical range expressed by the wording "a number to another number" means the range that falls between the former number indicating the lowermost limit of the range and the latter number indicating the uppermost limit thereof.

First of all, the terms to be used in the description will be explained.

[Definitions of Re and Rth]

In the description, Re(λ) (unit: nm) and Rth(λ) (unit: nm) each indicate retardation in plane and retardation along thickness direction of a sample, a film or the like, at a wavelength λ. Re(λ) is measured by applying a light having a wavelength of λ nm in the normal direction of the film, using KOBRA-21ADH or WR (by Oji Scientific Instruments).

When a film to be tested is represented by an uniaxial or biaxial refractive index ellipsoid, then its Rth(λ) is calculate according to the method mentioned below.

With the in-plane slow axis (determined by KOBRA 21ADH or WR) taken as the inclination axis (rotation axis) of the film (in case where the film has no slow axis, the rotation axis of the film may be in any in-plane direction of the film), Re(λ) of the film is measured at 6 points in all thereof, up to +50° relative to the normal direction of the film at intervals of 10°, by applying a light having a wavelength of λ nm from the inclined direction of the film.

With the in-plane slow axis from the normal direction taken as the rotation axis thereof, when the film has a zero retardation value at a certain inclination angle, then the symbol of the retardation value of the film at an inclination angle larger than that inclination angle is changed to a negative one, and then applied to KOBRA 21ADH or WR for computation.

With the slow axis taken as the inclination axis (rotation axis) (in case where the film has no slow axis, the rotation axis of the film may be in any in-plane direction of the film), the retardation values of the film are measured in any inclined two directions; and based on the data and the mean refractive index and the inputted film thickness, Rth may be calculated according to the following formulae (X) and (XI):

$$Re(\theta) = \left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad (X)$$

$$Rth = \{(nx+ny)/2 - nz\} \times d \quad (XI)$$

wherein Re(θ) means the retardation value of the film in the direction inclined by an angle θ from the normal direction; nx means the in-plane refractive index of the film in the slow axis direction; ny means the in-plane refractive index of the film in the direction vertical to nx; nz means the refractive index of the film vertical to nx and ny; and d is a thickness of the film.

When the film to be tested can not be represented by a monoaxial or biaxial index ellipsoid, or that is, when the film does not have an optical axis, then its Rth(λ) may be calculated according to the method mentioned below.

With the in-plane slow axis (determined by KOBRA 21ADH or WR) taken as the inclination axis (rotation axis) of the film, Re(λ) of the film is measured at 11 points in all thereof, from −50° to +50° relative to the normal direction of the film at intervals of 10°, by applying a light having a wavelength of λ nm from the inclined direction of the film. Based on the thus-determined retardation data of Re(λ), the mean refractive index and the inputted film thickness, Rth(λ) of the film is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.

In this description, when the retardation films A and B are differentiated in terms of their Re and Rth, then Re and Rth of the retardation film A are represented by "$Re_{(A)}$" and "$Rth_{(A)}$", and Re and Rth of the retardation film B are represented by "$Re_{(B)}$" and "$Rth_{(B)}$".

In the description, the term "slow axis" means a direction giving a maximum refractive index. In the description, the term "visible light region" means a range from 380 nm to 780 nm. And it is to be noted that the refractive indexes are measured at 548 nm unless the wavelength is specified.

In this description, the numerical data, the numerical ranges and the qualitative expressions (for example, expressions of "equivalent", "equal") that indicate the optical characteristics of constitutive members such as retardation films and liquid-crystal layers should be interpreted to indicate the numerical data, the numerical ranges and the properties including errors that are generally acceptable for liquid-crystal display devices and their constitutive members.

In this description, the expression that two retardation films differ in the "optical anisotropy" means that the difference in Re(548) or Rth(548) between retardation films A and B is equal to or more than 3 nm. For example, when Re(548) of a retardation film A is the same as Re(548) of a retardation film B but when Rth(548) of the retardation film A differs from Rth(548) of the retardation film B by 3 nm or more, then the two films differ from each other in the optical anisotropy. The same shall apply to the case where Rth(548) is the same but Re(548) differs by 3 nm or more.

A schematic outline view of one example of a liquid-crystal display device of the invention is shown in FIG. 1. In FIG. 1, the top is a viewers' side (front side), and the bottom is a backlight side.

The VA-mode liquid-crystal display device of FIG. 1 has a liquid-crystal cell LC (having an upper substrate 1, a lower substrate 3 and a liquid-crystal layer 5), and a pair of upper polarizing plate P1 and lower polarizing plate P2 disposed to sandwich the liquid-crystal cell LC therebetween. In general, a polarizing film is built in a liquid-crystal display device as a polarizing plate having a protective film on both surfaces thereof; but in FIG. 1, the outer protective film of the polarizing film is omitted. The polarizing plates P1 and P2 each have polarizing films 8*a* and 8*b*, respectively; and they are disposed so that their absorption axes 9*a* and 9*b* are orthogonal to each other. The liquid-crystal cell LC is a VA-mode liquid-crystal cell; and in the black state, the liquid-crystal layer 5 is in homeotropic alignment, as shown in FIG. 1. The upper substrate 1 and the lower substrate 3 each have an alignment film (not shown) and an electrode layer (not shown) on the inner face thereof, and the inner face of the substrate 1 on the viewers' side additionally has a color filter layer (not shown).

Between the upper substrate 1 and the upper polarizing film 8*a*, and between the lower substrate 3 and the lower polarizing film 8*b*, retardation films 10*a* and 10*b*, respectively, are disposed. The retardation films 10*a* and 10*b* are optically biaxial, and differ in the optical anisotropy. The retardation films 10*a* and 10*b* are disposed so that their in-plane slow axes 11*a* and 11*b* are orthogonal to the absorption axes 9*a* and 9*b*, respectively, of the upper polarizing film 8*a* and the lower polarizing film 8*b*. Specifically, the retardation films 10*a* and 10*b* are disposed so that their slow axes are orthogonal to each other. Heretofore, in a VA-mode liquid-crystal display device, the main stream of optical compensation employs two retardation films having the same optical anisotropy, or using A plate as one of two retardation films and C plate as the other thereof so as to realize a combination of retardation films satisfying the necessary optical characteristics; however, in the liquid-crystal display device of the invention shown in FIG. 1, employed is a novel type of optical compensation achieved by a combination of optically-biaxial retardation films 10*a* and 10*b* that differ from each other in terms of optical anisotropy. Preferably, the retardation films 10*a* and 10*b* differ in either one or both of Re(548) and Rth(548) by 3 nm or more; more preferably, the difference in Re(548) between the retardation films 10*a* and 10*b* is from 3 to 90 nm and the difference in Rth(548) therebetween is from 3 to 200 nm; even more preferably the difference in Re(548) is from 3 to 50 nm and the difference in Rth(548) is from 3 to 120 nm. When the difference in Re and Rth between the two retardation films falls within the range, the effect of the invention is remarkable.

In one preferred embodiment of the liquid-crystal display device of the invention, the retardation film 10*a* satisfies the following conditions (I) and (II), and the retardation film 10*b* satisfies the following conditions (III) and (IV):

$$20\text{ nm} \leqq Re_{(A)}(548) \leqq 65\text{ nm} \tag{I}$$

$$50\text{ nm} \leqq Rth_{(A)}(548) \leqq -2.5 \times Re_{(A)}(548) + 300\text{ nm} \tag{II}$$

$$45\text{ nm} \leqq Re_{(B)}(548) \leqq 110\text{ nm} \tag{III}$$

$$50\text{ nm} \leqq Rth_{(B)}(548) \leqq -2.5 \times Re_{(B)}(548) + 325\text{ nm} \tag{IV}$$

More preferably, the retardation film 10*a* satisfies the following conditions (I)' and (II)', and the retardation film 10*b* satisfies the following conditions (III)' and (IV)':

$$20\text{ nm} \leqq Re_{(A)}(548) \leqq 60\text{ nm} \tag{I'}$$

$$50\text{ nm} \leqq Rth_{(A)}(548) \leqq -2.5 \times Re_{(A)}(548) + 275\text{ nm} \tag{II'}$$

$$50\text{ nm} \leqq Re_{(B)}(548) \leqq 100\text{ nm} \tag{III'}$$

$$50\text{ nm} \leqq Rth_{(B)}(548) \leqq -2.5 \times Re_{(B)}(548) + 300\text{ nm} \tag{IV'}$$

Even more preferably, the retardation film 10*a* satisfies the following conditions (I)" and (II)", and the retardation film 10*b* satisfies the following conditions (III)" and (IV)":

$$20\text{ nm} \leqq Re_{(A)}(548) \leqq 55\text{ nm} \tag{I''}$$

$$50\text{ nm} \leqq Rth_{(A)}(548) \leqq -2.5 \times Re_{(A)}(548) + 250\text{ nm} \tag{II''}$$

$$55\text{ nm} \leqq Re_{(B)}(548) \leqq 90\text{ nm} \tag{III''}$$

$$50\text{ nm} \leqq Rth_{(B)}(548) \leqq -2.5 \times Re_{(B)}(548) + 275\text{ nm} \tag{IV''}$$

In case where the retardation films are disposed so that they satisfy the above conditions, or that is, where Re of the retardation film 10*b* disposed on the backlight side is large and Rth thereof is small, as compared with those of the retardation film 10*a* disposed on the displaying side, then the embodiment of the type is desirable from the viewpoint of reducing the color shift as so described hereinunder, since the retardation film having a larger Re may have larger wavelength dispersion characteristics of the retardation.

The retardation films 10*a* and 10*b* may serve also as protective films for the polarizing films 8*a* and 8*b*, respectively.

The liquid-crystal display device of the invention satisfies the requirement of thickness reduction; and in the prior-art technique, Δnd of a liquid-crystal layer (Δn: birefringence of liquid crystal, d: layer thickness) is 350 nm or so, but in the liquid-crystal display of FIG. 1, Δnd of the liquid-crystal layer 5 can be from 250 to 345 nm or so.

Figure 2:
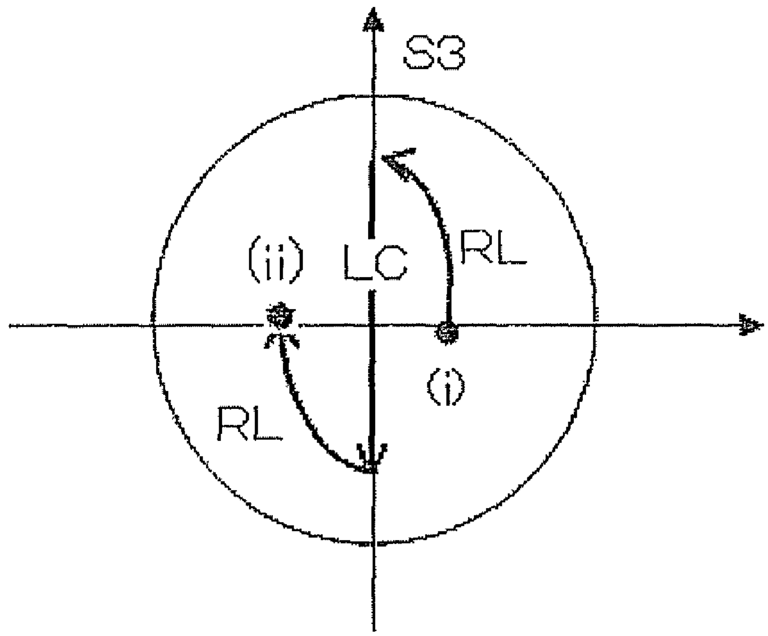
FIG. 2 is a view for explaining the optical compensation in a liquid-crystal display device of the invention.
Figure 3:
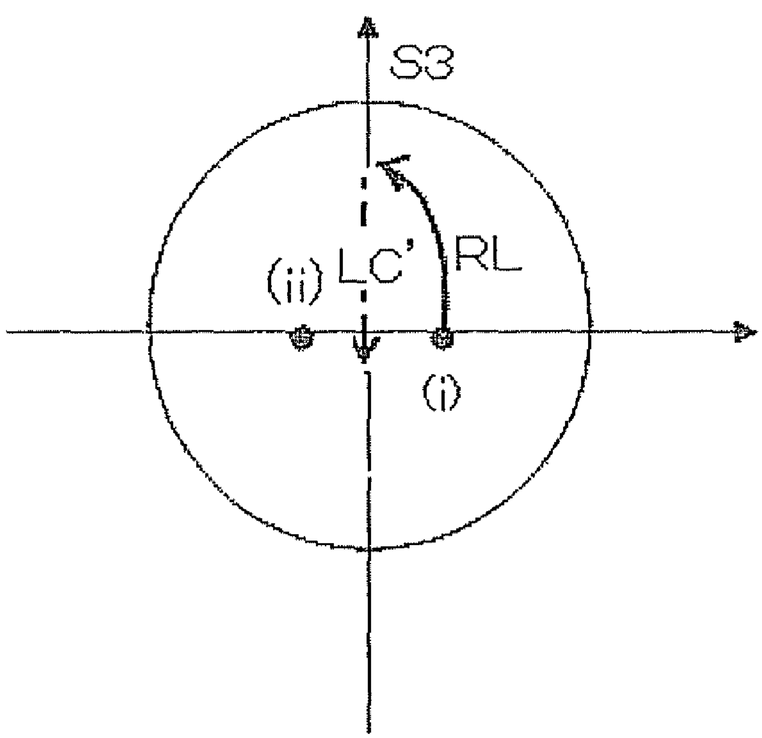
FIG. 3 is a view for explaining the optical compensation in a liquid-crystal display device of the invention.

In an embodiment that is based on the optical compensation principle similar to that of the VA-mode liquid-crystal display device of FIG. 1, or that is, in an embodiment where the birefringence to occur in the oblique direction in the black state of the liquid-crystal cell LC is compensated by Re and Rth of the two retardation films (like as retardation films 10*a* and 10*b* shown in FIG. 1) that have equivalent optical anisotropy and are disposed symmetrically around the center of the liquid-crystal cell, when the polarization state behavior is expressed as the movement on a Poincare sphere, then it may be, for example, as in FIG. 2. The Poincare sphere is a three-dimensional map that describes a polarization state, and the equator of the sphere indicates a polarization state of a linear polarized light having an ellipticity of 0. FIG. 2 is a view showing a Poincare sphere in the positive direction of the S2 axis thereof. The point (i) in FIG. 2 indicates a polarization state of a linear polarized light passing through the polarizing film disposed at the backlight side in the oblique direction in the black state; and when the polarization state point (i) is converted into a polarization state point (ii) which is an extinction point on the S1 axis, then it may solve a problem of contract reduction in oblique light introduction in a liquid-crystal display device. RL indicates the trace of a polarization state of light that passes through the retardation films symmetrically disposed on and below the liquid-crystal cell; and LC indicates the trace of a polarization state of light that passes through the liquid-crystal cell. Heretofore, in a VA-mode liquid-crystal cell in which retardation films having equivalent optical anisotropy are vertically symmetrically disposed as in FIG. 1, the polarization state of the incident light is converted as a point-symmetric trace as in FIG. 2, thereby reducing the light leakage in oblique directions in the black state. When the thickness of the liquid-crystal layer is reduced for thinning the device, Δnd of the liquid-crystal layer becomes small and the length of the arrow of LC indicating the trace of the conversion of the polarization state of light that passes through the liquid-crystal layer is thereby shortened. For example, even when optical compensation is tried in the same constitution of a thinned liquid-crystal layer (LC') as in FIG. 3, directly using a conventional retardation film as it is, then it is difficult to convert the point (i) to the point (ii) with the symmetric trace as in FIG. 2, since the arrow LC' is shorter than the arrow LC.

Figure 4A:
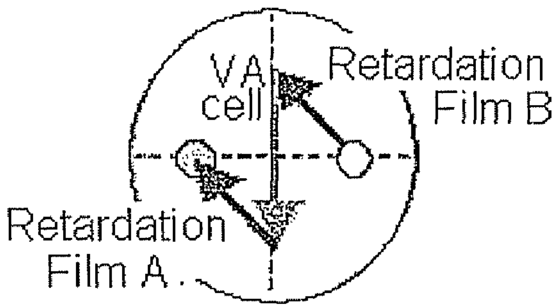
FIG. 4A is a schematic view of one example of an optical compensation system in the device.
Figure 4B:
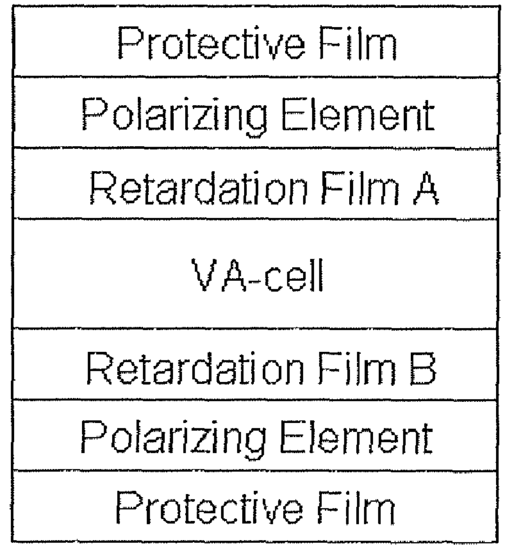
FIG. 4B is a schematic cross-sectional view of a VA-mode liquid-crystal display device of the invention.
Figure 5A:
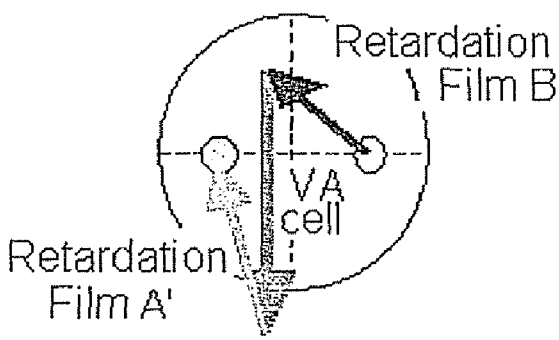
FIG. 5A is a schematic view of one example of an optical compensation system in the device.
Figure 5B:
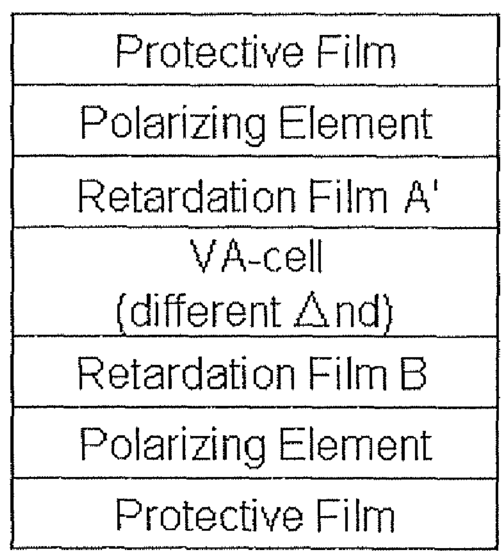
FIG. 5B is a schematic cross-sectional view of a VA-mode liquid-crystal display device of the invention.
Figure 7A:
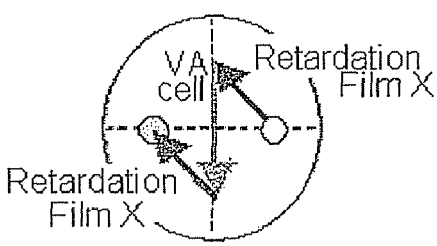
FIG. 7A is a schematic view of one example of an optical compensation system (homo system) in the device.
Figure 7B:
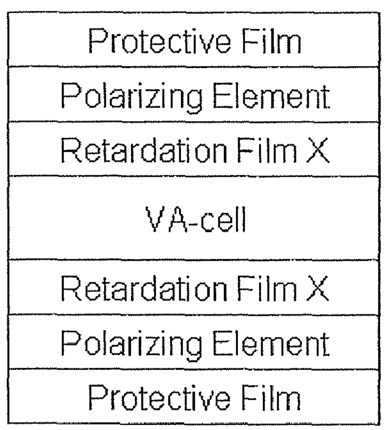
FIG. 7B is a schematic cross-sectional view of a conventional VA-mode liquid-crystal display device.
Figure 8A:
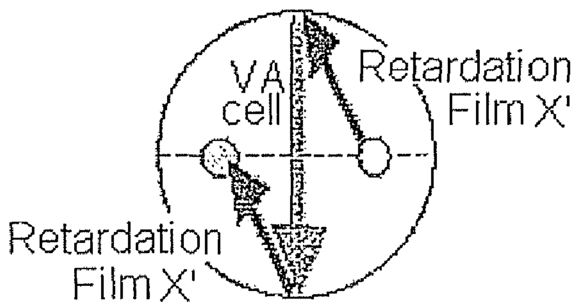
FIG. 8A is a schematic view of one example of an optical compensation system (homo system) in the device.
Figure 8B:
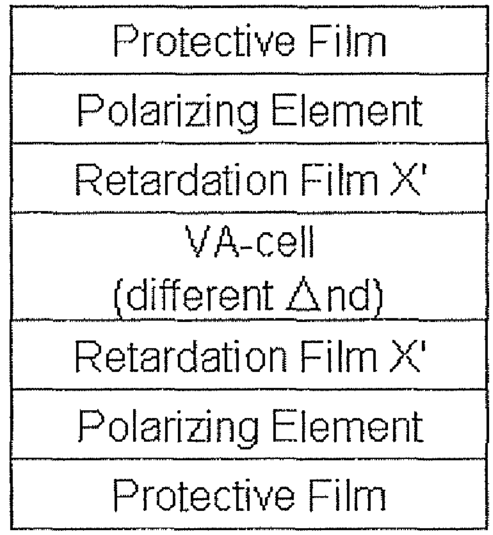
FIG. 8B is a schematic cross-sectional view of a conventional VA-mode liquid-crystal display device.
Figure 9A:
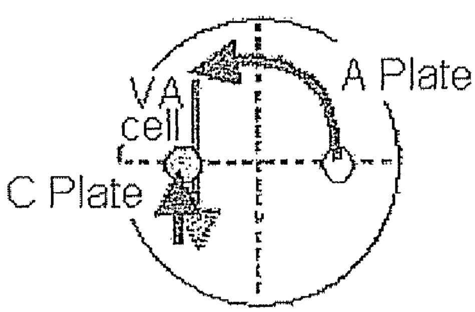
FIG. 9A is a schematic view of one example of an optical compensation system in the device.
Figure 9B:
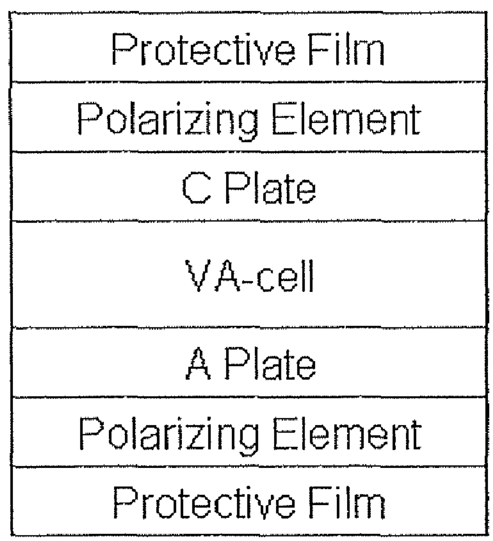
FIG. 9B is a schematic cross-sectional view of a conventional VA-mode liquid-crystal display device.

Accordingly, in the invention, shown in FIGS. 4A and 4B, optically biaxial retardation films A and B that differ from each other in terms of optical anisotropy (in FIG. 1, 10*a* and 10*b*) are used to thereby convert the polarization state around a different rotation axis and at a different rotation angle from those found in the embodiment employing conventional retardation films, whereby as a whole, the device of the invention has enabled the polarization state conversion in a point-symmetric trace like that found in the prior art to reduce the light leakage in oblique directions in the black state. When the conventional liquid crystal cell, LC, is replaced a new one having different Δnd, according to the conventional "homo-type" system, as shown in FIGS. 7A and 7B, it is necessary to re-plan the optical properties of the two retardation films X; and according to the conventional system employing the combination of C plate and A plate, as shown in FIGS. 9A and 9B, it is necessary to re-plan the optical properties of the C plate. It is difficult not only to adjust the optical properties of C plates but also to produce them. On the other hand, when the conventional liquid crystal cell, LC, is replaced with a new one having different Δnd, according to the invention, as shown in FIGS. 5A and 5B, only one of the two retardation films may be changed to any other one, Retardation Film A' having different optical properties from those of Retardation Film A used in the device shown in FIG. 4B. In addition, according to the invention, it is possible to change the retardation film of which optical properties are more adjustable compared with another (for example, it is possible to change the retardation film having smaller Re to any other one). This is advantageous in terms of cost reduction and production process simplification.

According to the invention, the retardation films A and B are not specifically defined in terms of wavelength dispersion characteristics of Re and Rth thereof in a visible light region. The wavelength dispersion characteristics of Re and Rth are grouped into three types: regular wavelength dispersion characteristics of retardation of such that Re or Rth increases when the wavelength of the incident light is shorter; reversed wavelength dispersion characteristics of retardation of such that Re or Rth increases when the wavelength of the incident light is longer; and constant Re and Rth irrespective of the wavelength of the incident light. The retardation films A and B may be the same or different in terms of the wavelength dispersion characteristics of Re and Rth thereof. For example, the retardation films A and B may be in any combination of the following:

(i) A combination of a retardation film A having regular wavelength dispersion characteristics of Re and Rth, and a retardation film B having regular wavelength dispersion characteristics of Re and Rth;

(ii) A combination of a retardation film A having regular wavelength dispersion characteristics of Re and Rth, and a retardation film B having reversed wavelength dispersion characteristics of Re and Rth;

(iii) A combination of a retardation film A having regular wavelength dispersion characteristics of Re and Rth, and a retardation film B having constant Re and Rth irrespective of the wavelength of the incident light thereto;

(iv) A combination of a retardation film A having reversed wavelength dispersion characteristics of Re and Rth, and a retardation film B having regular wavelength dispersion characteristics of Re and Rth;

(v) A combination of a retardation film A having reversed wavelength dispersion characteristics of Re and Rth, and a retardation film B having reversed wavelength dispersion characteristics of Re and Rth;

(vi) A combination of a retardation film A having reversed wavelength dispersion characteristics of Re and Rth, and a retardation film B having constant Re and Rth irrespective of the wavelength of the incident light thereto;

(vii) A combination of a retardation film A having constant Re and Rth irrespective of the wavelength of the incident light thereto, and a retardation film B having regular wavelength dispersion characteristics of Re and Rth;

(viii) A combination of a retardation film A having constant Re and Rth irrespective of wavelength of the incident light thereto, and a retardation film B having reversed wavelength dispersion characteristics of Re and Rth;

(ix) A combination of a retardation film A having constant Re and Rth irrespective of wavelength of the incident light thereto, and a retardation film B having constant Re and Rth irrespective of wavelength of the incident light thereto.

The change in the polarization state of light passing through a retardation region is expressed by rotation at a specific angle around a specific axis determined in accordance with the optical characteristics, Nz value (concretely, the value to be obtained by adding 0.5 to Rth/Re) within the retardation region, on a Poincare sphere. The rotation angle (degree of rotation) is proportional to the retardation in the retardation region through which the incident light has passed, and is proportional to the reciprocal number of the wavelength of the incident light. For example, when a retardation film having a constant Re not depending on the wavelength of light is used, then the light having a shorter wavelength may rotate larger while the light having a longer wavelength may rotate smaller. As a result, even when the optical characteristics of the retardation film are optimized so that the film could have an extinction point with G light (at about 550 nm) that has an intermediate wavelength in a visible light region, the film could not convert the polarization state of R light having a longer wavelength (about 650 nm) and B light having a shorter wavelength (about 450 nm) into the extinction point, therefore still having a problem of color shift in oblique directions. In order to reduce the color shift, the combinations of (ii), (iii) and (viii) of the above-mentioned combinations are preferred, and the combinations (ii) and (viii) are more preferred. Further, the retardation film A and the retardation film B preferably satisfy the following conditions (V) and (VI):

$$Re_{(A)}(446)-Re_{(A)}(548)>Re_{(B)}(446)-Re_{(B)}(548) \quad (V)$$

$$Rth_{(A)}(446)-Rth_{(A)}(548)>Rth_{(B)}(446)-Rth_{(B)}(548). \quad (VI)$$

More preferably, the films satisfy the following conditions (VII) and (VIII):

$$Re_{(A)}(446)-Re_{(A)}(548)>0>Re_{(B)}(446)-Re_{(B)}(548) \quad (VII)$$

$$Rth_{(A)}(446)-Rth_{(A)}(548)>0>Rth_{(B)}(446)-Rth_{(B)}(548). \quad (VIII)$$

Regarding the position of the retardation film A and the retardation film B, herein acceptable is any of an embodiment where the retardation film A is on the front side and the retardation film B is on the rear side, or contrary to this, an embodiment where the retardation film A is on a rear side and the retardation film B is on the front side.

In the invention, the retardation films (in FIG. 1, 10*a* and 10*b*) may act, on the Poincare sphere of FIG. 2, not like the movement of RL but for polarization conversion around a specific axis as shown in FIG. 4A; and for enabling optical compensation even though the thickness of the liquid-crystal layer is small, preferably, both the retardation films A and B satisfy Rth(548)/Re(548) of being from 0.5 to 13, more preferably from 1 to 10, even more preferably from 2 to 7.

Above all, especially preferred is a combination of retardation films A and B where Re of the retardation film A is from 25 to 45 nm, Rth thereof is from 100 to 140 nm, and the retardation film A has regular wavelength dispersion characteristics of Re and Rth, and where Re of the retardation film B is from 65 to 85 nm, Rth thereof is from 80 to 120 nm, and the retardation film B has reversed wavelength dispersion characteristics of Re and Rth. The reason is as follows:

For reducing the brightness and the color shift in oblique directions in the black state, for example, it is desired that the polarization state of polarized light with a different wavelength, after having passed through the rear side polarizer, the rear side retardation film B, the liquid-crystal cell, and the front side retardation film A, is parallel to the absorption axis of the front side polarizer observed in oblique directions. This is described on the Poincare sphere. Blue, green and red lights (B, G, R) finally reach the point S1 (extinction point) on the absorption axis of the front side polarizer in oblique directions, and the phenomenon can be expressed in a simplified manner. This mechanism is described with reference to FIGS. 6A-6C.

Figure 6A:
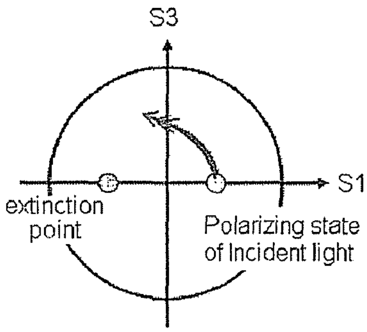
FIGS. 6A-6C are views for explaining the optical compensation in a liquid-crystal display device of the invention.

The I linear polarized light, passed through the rear side polarizer, enters the rear side retardation film B, and as shown in FIG. 6A, it rotates on the Poincare sphere surface owing to its Re. According to the embodiment, since Re of the retardation film B has reversed wavelength dispersion characteristics, the points to indicate the polarization state of BGR may be close to each other (the polarization state of BGR is similar to each other).

Figure 6B:
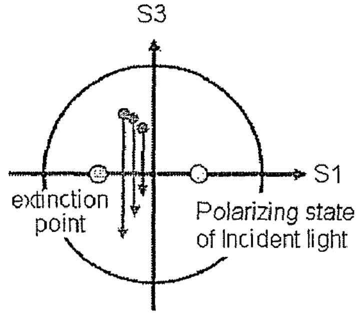

Next, when the light enters the VA-mode liquid-crystal cell, the points to indicate the polarization state of BGR may be away from each other, as shown in FIG. 6B, owing to regular wavelength dispersion characteristics of birefringence of the VA liquid-crystal cell (the polarization state of BGR differs from each other).

Figure 6C:
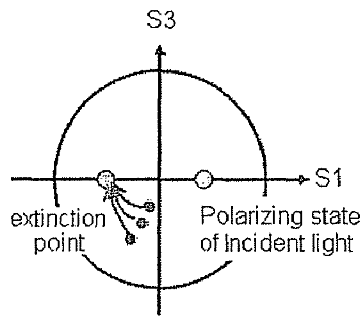

Finally, when the light enters the front-side retardation film A, the separation among the polarization states of BGR, which is occurred by passing through the VA-mode liquid-crystal cell, may be canceled, as shown in FIG. 6C, owing to regular wavelength dispersion characteristics of Rth of the front-side retardation film A, and the polarization state of BGR may reach the extinction point.

Regarding this mechanism, the same as above may apply to other embodiments where the front-side and rear-side retardation films are replaced for each other.

Regarding the compensation effect and mechanism of the above-mentioned "homo-type" device or "C plate+A plate combination" device, the same planning as that based on the same discussion as above is made, as in FIGS. 11A-11C and FIGS. 12A-12C.

However, according to the "homo-type" device, as shown in FIGS. 11A-11C, the polarization states of BGR reach the extinction point, which requires two retardation films exhibiting regular wavelength dispersion characteristics in terms of Rth and exhibiting reversed wavelength dispersion characteristics in terms of Re; but it is extremely difficult to produce any films having such properties and its production aptitude is narrow and production costs may increase. Accordingly, actually, films exhibiting the same wavelength dispersion characteristics in terms of both of Re and Rth are often used in the "homo-type" device.

Figure 12A:
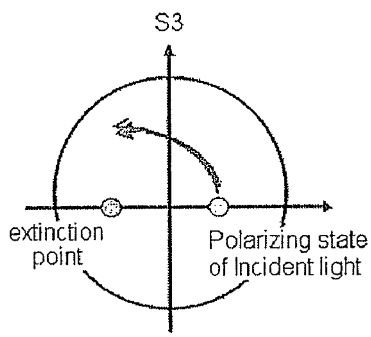
FIGS. 12A-12C are views for explaining the optical compensation in a conventional VA-mode liquid-crystal display device (C plate+A plate system).
Figure 12B:
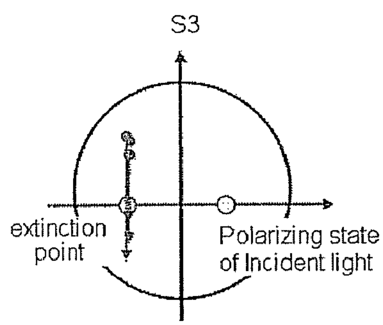
Figure 12C:
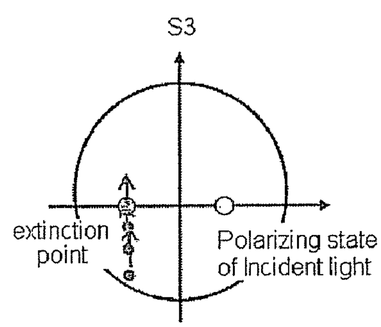

According to the "C plate+A plate combination" system, as shown in FIGS. 12A-12C, the polarization states of BGR reach the extinction point, which requires C plate exhibiting regular wavelength dispersion characteristics of retardation; but it is extremely difficult to produce C plates exhibiting such characteristics, and the latitude in producing the C plate of the type is narrow and the production cost for it is high. Accordingly, actually, C plates having poor regular wavelength dispersion characteristics of retardation are often used in the "C plate+A plate combination" system.

As described above, in terms of reducing the color shift in a simplified manner, the optical compensation according to the "hetero-type" combination of this embodiment is especially preferred, as compared with the other "homo-type" and "C plate+A plate combination" system.

The invention is preferably an embodiment of a VA-mode liquid-crystal display device. Of the VA-mode, more preferred is a multidomain structure in which one pixel is divided into plural regions, as the horizontal and vertical viewing angle characteristics of the structure are averaged and its display quality is good.

Depending on the driving mode thereof, the liquid-crystal display device of the invention includes different applications of an active matrix liquid-crystal display device comprising a 3-terminal or 2-terminal semiconductor element such as TFT (thin film transistor) or MIM (metal insulator metal), and a passive matrix liquid-crystal display device such as typically an STN-mode referred to as time sharing drive; and the invention is effective in all of these.

Various parts constituting the liquid-crystal display device of the invention are described in detail hereinunder.

[Retardation Films A and B]

The retardation films A and B for use in the invention are not specifically defined in terms of their materials, so far as they satisfy the above-mentioned requirements. When the retardation films A and B are polymer films, then they may be stuck to a polarizing element. As a single member, they may be built in the liquid-crystal display device of the invention, for example, as an optical compensatory film therein. Regarding the material for the polymer film, preferred are polymers excellent in the optical properties, transparency, mechanical strength, thermal stability, water shieldability and isotropy; however any material satisfying the above-mentioned conditions may be used herein. For example, examples of the material include polycarbonate polymers; polyester polymers such as polyethylene terephthalate and polyethylene naphthalate; acrylic polymers such as polymethyl methacrylate; styrenic polymers such as polystyrene and acrylonitrile/styrene copolymer (AS resin); etc. As examples of the material, also mentioned are cycloolefin-based polymers such as norbornene resin; polyolefins such as polyethylene and polypropylene; polyolefinic polymers such as ethylene/propylene copolymer; vinyl chloride-based polymers; amide polymers such as nylon and aromatic polyamide; imide polymers, sulfone polymers, polyether sulfone polymers, polyether ether ketone polymers, polyphenylene sulfide polymers, vinylidene chloride polymers, vinyl alcohol polymers, vinyl butyral polymers, arylate polymers, polyoxymethylene polymers, epoxy polymers; and mixtures of the above-mentioned polymers.

As the material to form the polymer film, preferably used are cycloolefin-based polymers. Examples of the cycloolefin-based polymer include commercially-available polymers such as Nippon Zeon's ZEONEX, ZEONOR; JSR's ARTON; etc. These are stretched to produce the above-mentioned retardation films A and B.

As the material to form the polymer film, also preferably used is a cellulose polymer (this is referred to as cellulose acylate) heretofore generally used as a transparent protective film for polarizing plates. The retardation films A and B for use in the invention satisfy the above-mentioned conditions (I) and (II). Heretofore, a cellulose acylate film comprising a cellulose acylate as the main ingredient thereof could hardly attain the optical characteristics of the above-mentioned conditions (I) and (II). For example, when Re is increased to satisfy the above condition (i), then Rth of the condition (II) may be over the uppermost value (140 nm); and it is difficult to produce a cellulose acylate film satisfying both the conditions (I) and (II) at the same time. Even though a film satisfying both the two could be produced, it still has a problem in that it is extremely thick. Accordingly, as described hereinunder, it is desirable that an additive such as a liquid-crystal compound or the like is added to the polymer and the intended cellulose acylate film satisfying the conditions (I) and (II) is produced and is used as the retardation films A and B.

Cellulose Acylate:

Representative examples of the cellulose acylate to be used for preparing the retardation films include triacetyl cellulose. A cellulose as a raw material for cellulose acylate is a cotton linter, a wood pulp (a needle leaf tree pulp or a broad leaf tree pulp), or the like. Cellulose acylate obtained from any raw material cellulose can be used. A plurality of raw material celluloses may be mixed as required. The raw material cellulose described in, for example, Maruzawa & Uda, Plastic Material Lecture (17) Cellulosic Resin, by Nikkan Kogyo Shinbun (1970); and Hatsumei Kyokai's Disclosure Bulletin No. 2001-1745 (pp. 7-8), can be used. There is no specific limitation on the raw material for the cellulose acylate film.

The degree of substitution of cellulose acylate means the ratio of acylation for three hydroxyl groups in a cellulose unit ((β) 1,4-glycoside bonded glucose). The degree of substitution (the ratio of acylation) can be calculated based on the amount of fatty acids combining with a cellulose unit. The measurement is carried out according to the method described in ASTM: D-817-91.

Preferred examples of the cellulose acylate to be used for preparing the retardation films include cellulose acetates having the degree of acetyl-substitution falling within the range from 2.50 to 3.00. The degree of acetyl-substitution is preferably 2.70 to 2.97. The cellulose acylate(s) having the acyl group(s) other than the acetyl group together with or in place of the acetyl group may be used. Among such cellulose acylates, cellulose acylates having at least one acyl group selected from an acetyl group, a propionyl group and a butyryl group are preferable; and cellulose acylates having at least two acyl groups selected from an acetyl group, a propionyl group and a butyryl group are more preferable.

The cellulose acylate has preferably a mass average degree of polymerization of 350 to 800, and more preferably a mass average degree of polymerization of 370 to 600. The cellulose acylate used in the present invention has preferably an average molecular weight of 70000 to 230000, more preferably 75000 to 230000, and still more preferably 78000 to 120000.

The cellulose acylate can be synthesized using an acid anhydride or an acid chloride as an acylation agent. In a synthesizing method which is most general in the industry, the cellulose obtained from cotton linter or wood pulp is esterified to a mixed organic acid component containing an organic acid (acetic acid, propionic acid, or butyric acid) corresponding to other acyl groups and an acetyl group, or acid anhydride (acetic acid anhydride, propionic acid anhydride, or butyric acid anhydride) to synthesize the cellulose ester.

The cellulose acylate film is preferably produced according to a solvent cast method. Examples of preparation of the cellulose acylate film according to the solvent cast method may include U.S. Pat. Nos. 2,336,310, 2,367,603, 2,492,078, 2,492,977, 2,492,978, 2,607,704, 2,739,069, and 2,739,070, British Patent Nos. 640731 and 736892, JPB Nos. syo 45-4554 and syo 49-5614, and JPA Nos. syo 60-176834, syo 60-203430, and syo 62-115035. The cellulose acylate film may be stretched. A method of stretching the cellulose acylate film and the condition thereof are disclosed in JPA Nos. syo 62-115035, hei 4-152125, hei 4-284211, hei 4-298310, and hei 11-48271.

It is to be noted that additives such as liquid crystal compounds described hereinafter may be added to a solution of a cellulose acylate composition when the cellulose acylate film is prepared according to the solvent cast method. For example, a solution prepared by dissolving additives such as liquid crystal compounds may be added to a solution of a cellulose acylate composition.

The retardation films preferably contain cellulose acylate(s) as a major ingredient.

For preparing the cellulose acylate films having the optical properties required for the retardation film A or B, the cellulose acylate composition containing at least any one of ingredients described hereinunder is preferably used for preparing such cellulose acylate films.

Discotic Compound:

Preferably, at least one discotic compound having an absorption peak at a wavelength falling within the range from 250 nm to 380 nm is added to the cellulose acylate film for use as the retardation film. The discotic compound may be liquid-crystalline or non-liquid-crystalline. Preferably, a liquid-crystal compound is used along with the discotic compound (preferably a liquid crystal compound represented by formula (A) and/or a liquid crystal compound represented by formula (a)), as capable of controlling the development of retardation (Re and Rth) and as effective for facilitating the dissolution of the liquid-crystal compound.

The content of the discotic compound having an absorption peak at a wavelength falling within the range from 250 nm to 380 nm in the film is preferably from 0.1 to 30% by mass relative to the main ingredient, cellulose acylate, in the film, and more preferably from 1 to 20% by mass. Within the range, the compound does not cause a problem of bleeding out, and can favorably attain its effect.

Liquid-Crystal Compound:

In the invention, for producing the cellulose acylate film that satisfies the requirements for retardation films, at least one liquid-crystal compound serving as an Re enhancer is added to the cellulose acylate film. "Re enhancer" as referred to herein is a compound having the property of expressing an in-plane birefringence of film.

The liquid-crystal compound for use in the invention expresses a liquid-crystal phase preferably within a temperature range of from 100° C. to 300° C., more preferably from 120° C. to 250° C. The liquid-crystal phase is preferably a columnar phase, a nematic phase or a smectic phase, more preferably a nematic phase or a smectic phase.

In the invention, plural liquid-crystal compounds may be used. In that case, it is desirable that the mixture of plural liquid-crystal compounds still exhibits liquid crystallinity, and preferably, even the mixture could form the same liquid-crystal phase as the liquid-crystal phase of the individual liquid-crystal compounds.

In this description, the evaluation for liquid crystallinity of the liquid-crystal compound to be used as a retardation enhancer may be attained as follows: Using a polarizing microscope Eclipse E600POL (by Nikon), a compound is visually checked for the liquid-crystal condition thereof, and its phase transition temperature is measured. For the temperature control, used is a hot stage FP82HT (by Mettler Toledo) connected to FP90 (by Mettler Toledo), and from the optical texture change observed with a polarizing microscope, the liquid-crystal phase is identified.

A liquid-crystal compound is metered and taken into a sample bottle, and this is dissolved in an organic solvent (e.g., methylene chloride) to form a uniform solution, and then the solvent is removed by evaporation.

A sample of the compound for evaluation for liquid crystallinity, prepared in the manner as above, is sandwiched between a slide glass and a cover glass, and on the hot stage, this is heated at a speed of 10° C./min, whereupon the change of the sample with the lapse of time is observed with the polarizing microscope.

As a result, when the compound tested forms a liquid-crystal phase, then it is determined that the compound has liquid crystallinity; and when it does not form a uniform liquid-crystal phase but forms an isotropic phase or an ununiform phase, then it is determined that the compound does not have liquid crystallinity.

The content of the liquid-crystal compound in the film is preferably from 0.1 to 30% by mass relative to the main ingredient, cellulose acylate, in the film, and more preferably from 1 to 20% by mass. Within the range, the compound is effective not causing a problem of bleeding out.

The cellulose acylate film used as the retardation film A or B preferably contains at least one liquid crystal compound represented by formula (A). By using the liquid crystal compound(s) represented by formula (A), the retardation film, having increased retardation and showing the reversed wavelength dispersion characteristics of retardation, may be prepared.

Formula (A)

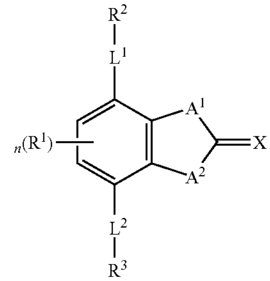

In the formula, $L^1$ and $L^2$ independently represent a single bond or a divalent linking group; $A^1$ and $A^2$ independently represent a group selected from the group consisting of —O—, —NR— where R represents a hydrogen atom or a substituent, —S— and —CO—; $R^1$, $R^2$ and $R^3$ independently represent a substituent; X represents a nonmetal atom selected from the groups 14-16 atoms, provided that X may bind with at least one hydrogen atom or substituent; and n is an integer from 0 to 2.

Among the compounds represented by the formula (A), the compounds represented by the formula (B) are preferred as a retardation enhancer.

Formula (B)

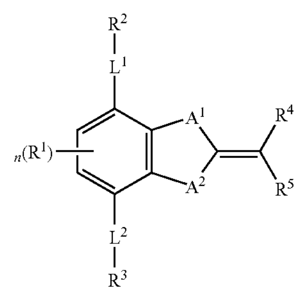

In the formula (B), $L^1$ and $L^2$ independently represent a single bond or a divalent group. $A^1$ and $A^2$ independently represent a group selected from the group consisting of —O—, —NR— where R represents a hydrogen atom or a substituent, —S— and —CO—. $R^1$, $R^2$ and $R^3$ independently represent a substituent. And n is an integer from 0 to 2.

Preferred examples of the divalent linking group represented by $L^1$ or $L^2$ in the formula (A) or (B) include those shown below.

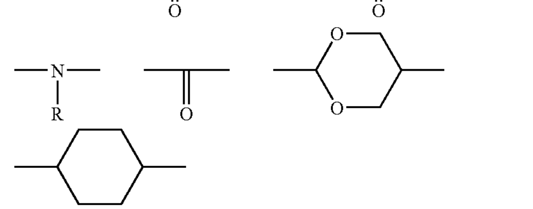

And further preferred are —O—, —COO— and —OCO—.

In the formulae (A) and (B), $R^1$ represents a substituent, if there are two or more R, they may be same or different from each other, or form a ring. Examples of the substituent include those shown below.

Halogen atoms such as fluorine, chlorine, bromine and iodine atoms; alkyls (preferably $C_{1-30}$ alkyls) such as methyl, ethyl, n-propyl, iso-propyl, tert-butyl, n-octyl, and 2-ethylhexyl; cycloalkyls (preferably $C_{3-30}$ substituted or non-substituted cycloalkyls) such as cyclohexyl, cyclopentyl and 4-n-dodecylcyclohexyl; bicycloalkyls (preferably $C_{5-30}$ substitute or non-substituted bicycloalkyls, namely monovalent residues formed from $C_{5-30}$ bicycloalkanes from which a hydrogen atom is removed) such as bicyclo[1,2,2]heptane-2-yl and bicyclo[2,2,2]octane-3-yl; alkenyls (preferably $C_{2-30}$ alkenyls) such as vinyl and allyl; cycloalkenyls (preferably $C_{3-30}$ substituted or non-substituted cycloalkenyls, namely monovalent residues formed from $C_{3-30}$ cycloalkenes from which a hydrogen atom is removed) such as 2-cyclopentene-1-yl and 2-cyclohexene-1-yl; bicycloalkenyls (preferably $C_{5-30}$ substituted or non-substituted bicycloalkenyls, namely monovalent residues formed from $C_{5-30}$ bicycloalkenes from which a hydrogen atom is removed) such as bicyclo[2,2,1]hepto-2-en-1-yl and bicyclo[2,2,2]octo-2-en-4-yl; alkynyls (preferably $C_{2-30}$ substitute or non-substituted alkynyls) such as ethynyl and propargyl; aryls (preferably $C_{6-30}$ substitute or non-substituted aryls) such as phenyl, p-tolyl and naphthyl; heterocyclic groups (preferably (more preferably $C_{3-30}$) substituted or non-substituted, 5-membered or 6-membered, aromatic or non-aromatic heterocyclic monovalent residues) such as 2-furyl, 2-thienyl, 2-pyrimidinyl and 2-benzothiazolyl; cyano, hydroxyl, nitro, carboxyl, alkoxys (preferably $C_{1-30}$ substituted or non-substituted alkoxys) such as methoxy, ethoxy, iso-propoxy, t-butoxy, n-octyloxy and 2-methoxyethoxy; aryloxys (preferably $C_{6-30}$ substituted or non-substituted aryloxys) such as phenyloxy, 2-methylphenoxy, 4-t-butylphenoxy, 3-nitrophenoxy and 2-tetradecanoyl phenoxy; silyloxys (preferably $C_{3-20}$ silyloxys) such as trimethylsilyloxy and t-butyldimethylsilyloxy; hetero-cyclic-oxys (preferably $C_{2-30}$ substituted or non-substituted hetero-cyclic-oxys) such as 1-phenyltetrazole-5-oxy and 2-tetrahydropyrenyloxy; acyloxys (preferably $C_{2-30}$ substitute or non-substituted alkylcarbonyloxys and $C_{6-30}$ substituted or non-substituted arylcarbonyloxys) such as formyloxy, acetyloxy, pivaloyloxy, stearoyoxy, benzoyloxy and p-methoxyphenylcarbonyloxy; carbamoyloxys (preferably $C_{1-30}$ substituted or non-substituted carbamoyloxys) such as N,N-dimethyl carbamoyloxy, N,N-diethyl carbamoyloxy, morpholinocarbonyloxy, N,N-di-n-octylaminocarbonyloxy and N-n-octylcarbamyloxy; alkoxy carbonyloxys (preferably $C_{2-30}$ substituted or non-substituted alkoxy carbonyloxys) such as methoxy carbonyloxy, ethoxy carbonyloxy, t-butoxy carbonyloxy and n-octyloxy carbonyloxy; aryloxy carbonyloxys (preferably $C_{7-30}$ substituted or non-substituted aryloxy carbonyloxys) such as phenoxy carbonyloxy, p-methoxyphenoxy carbonyloxy and p-n-hexadecyloxyphenoxy carbonyloxy; aminos (preferably $C_{0-30}$ substituted or non-substituted alkylaminos and $C_{6-30}$ substituted or non-substituted arylaminos) such as amino, methylamino, dimethylamino, anilino, N-methyl-anilino and diphenylamino; acylaminos (preferably $C_{1-30}$ substituted or non-substituted alkylcarbonylaminos and $C_{6-30}$ substituted or non-substituted arylcarbonylaminos) such as formylamino, acetylamino, pivaloylamino, lauroylamino and benzoylamino; aminocarbonylaminos (preferably $C_{1-30}$ substituted or non-substituted aminocarbonylaminos) such as carbamoylamino, N,N-dimethylaminocarbonylamino, N,N-diethylamino carbonylamino and morpholino carbonylamino; alkoxycarbonylaminos (preferably $C_{2-30}$ substituted or non-substituted alkoxycarbonylaminos) such as methoxycarbonylamino, ethoxycarbonylamino, t-butoxycarbonylamino, n-octadecyloxycarbonylamino and N-methyl-methoxy carbonylamino; aryloxycarbonylaminos (preferably $C_{7-30}$ substituted or non-substituted aryloxycarbonylaminos) such as phenoxycarbonylamino, p-chloro phenoxycarbonylamino and m-n-octyloxy phenoxy carbonylamino; sulfamoylaminos (preferably $C_{0-30}$ substituted or non-substituted sulfamoylaminos) such as sulfamoylamino, N,N-dimethylamino sulfonylamino and N-n-octylamino sulfonylamino; alkyl- and aryl-sulfonylaminos (preferably $C_{1-30}$ substituted or non-substituted alkyl-sulfonylaminos and $C_{6-30}$ substituted or non-substituted aryl-sulfonylaminos) such as methyl-sulfonylamino, butyl-sulfonylamino, phenyl-sulfonylamino, 2,3,5-trichlorophenyl-sulfonylamino and p-methylphenyl-sulfonylamino; mercapto; alkylthios (preferably substituted or non-substituted $C_{1-30}$ alkylthios such as methylthio, ethylthio and n-hexadecylthio; arylthios (preferably $C_{6-30}$ substituted or non-substituted arylthios) such as phenylthio, p-chlorophenylthio and m-methoxyphenylthio; heterocyclic-thios (preferably $C_{2-30}$ substituted or non-substituted heterocyclic-thios such as 2-benzothiazolyl thio and 1-phenyltetrazol-5-yl-thio; sulfamoyls (preferably $C_{0-30}$ substituted or non-substituted sulfamoyls) such as N-ethylsulfamoyl, N-(3-dodecyloxypropyl)sulfamoyl, N,N-dimethylsulfamoyl, N-acetylsulfamoyl, N-benzoylsulfamoyl, N—(N'-phenylcarbamoyl)sulfamoyl; sulfo; alkyl- and aryl-sulfinyls (preferably $C_{1-30}$ substituted or non-substituted alkyl- or $C_{6-30}$ substituted or non-substituted aryl-sulfinyls) such as methylsulfinyl, ethylsulfinyl, phenylsulfinyl and p-methylphenylsulfinyl; alkyl- and aryl-sulfonyls (preferably $C_{1-30}$ substituted or non-substituted alkyl-sulfonyls and $C_{6-30}$ substituted or non-substituted arylsulfonyls) such as methylsulfonyl, ethylsulfonyl, phenylsulfonyl and p-methylphenylsulfonyl; acyls (preferably $C_{2-30}$ substituted non-substituted alkylcarbonyls, and $C_{7-30}$ substituted or non-substituted arylcarbonyls) such as formyl, acetyl and pivaloyl benzyl; aryloxycarbonyls (preferably $C_{7-30}$ substituted or non-substituted aryloxycarbonyls) such as phenoxycarbonyl, o-chlorophenoxycarbonyl, m-nitrophenoxycarbonyl and p-t-butylphenoxycarbonyl; alkoxycarbonyls (preferably $C_{2-30}$ substituted or non-substituted alkoxycarbonyls) methoxycarbonyl, ethoxycarbonyl, t-butoxycarbonyl and n-octadecyloxycarbonyl; carbamoyls (preferably $C_{1-30}$ substituted or non-substituted carbamoyls) such as carbamoyl, N-methylcarbamoyl, N,N-dimethylcarbamoyl, N,N-di-n-octylcarbamoyl and N-(methylsulfonyl)carbamoyl; aryl- and heterocyclic-azos (preferably $C_{6-30}$ substituted or non-substituted arylazos and $C_{3-30}$ substituted or non-substituted heterocyclicazos) such as phenylazo and p-chlorophenylazo, 5-ethylthio-1,3,4-thiadiazol-2-yl-azo, imides such as N-succinimide and N-phthalimide; phosphinos (preferably $C_{2-30}$ substituted or non-substituted phosphinos) such as dimethyl phosphino, diphenyl phosphino and methylphenoxy phosphino; phosphinyls (preferably $C_{2-30}$ substituted or non-substituted phosphinyls) such as phosphinyl, dioctyloxy phosphinyl and diethoxy phosphinyl; phosphinyloxys (preferably $C_{2-30}$ substituted or non-substituted phosphinyloxys) such as diphenoxyphosphinyloxy and dioctyloxyphosphinyloxy; phosphinylaminos (preferably $C_{2-30}$ substituted or non-substituted phosphinylaminos) such as dimethoxy phosphinylamino and dimethylamino phosphinylamino; and silyls (preferably $C_{3-30}$ substituted or non-substituted silyls) such as trimethylsilyl, t-butylmethylsilyl and phenyldimethylsilyl.

The substituents, which have at least one hydrogen atom, may be substituted by at least one substituent selected from these. Examples such substituent include alkylcarbonylaminosulfo, arylcarbonylaminosulfo, alkylsulfonylaminocarbonyl and arylsulfonylaminocarbonyl. More specifically, methylsulfonylaminocarbonyl, p-methylphenylsulfonylaminocarbonyl, acetylaminosulfonyl and benzoylaminosulfonyl are exemplified.

Preferably, $R^1$ represents a hydrogen atom, an alkyl group, an alkenyl group, an aryl group, a heterocyclic group, hydroxyl, carboxyl, an alkoxy group, an acyloxy group, cyano or an amino group; and more preferably, a halogen atom, an alkyl group, cyano or an alkoxy group.

$R^2$ and $R^3$ independently represent a substituent. Examples of the substituent include those exemplified above as examples of $R^1$. Preferably, $R^2$ and $R^3$ independently represent a substituted or non-substituted phenyl or a substituted or non-substituted cyclohexyl; more preferably, a substituted phenyl or a substituted cyclohexyl; and much more preferably, a phenyl having a substituent at a 4-position or a cyclohexyl having a substituent at a 4-position.

$R^4$ and $R^5$ independently represent a substituent. Examples of the substituent include those exemplified above as examples of $R^1$. Preferably, $R^4$ and $R^5$ independently represent an electron-attractant group having the Hammett value, $\sigma_p$, more than 0; more preferably an electron-attractant group having the Hammett value, $\sigma_p$, from 0 to 1.5. Examples of such an electron-attractant group include trifluoromethyl, cyano, carbonyl and nitro. $R^4$ and $R^5$ may bind to each other to form a ring.

It is to be noted that, regarding Hammett constant of the substituent, $\sigma_p$ and $\sigma_m$, there are detailed commentaries on the Hammett constant of the substituent, $\sigma_p$ and $\sigma_m$ in "Hammett Rule-Structure and Reactivity-(Hammeto soku-Kozo to Hanohsei)" published by Maruzen and written by Naoki Inamoto; "New Experimental Chemistry 14 Synthesis and Reaction of Organic Compound V (Shin Jikken Kagaku Koza 14 Yuuki Kagoubutsu no Gousei to Hannou)" on p. 2605, edited by Chemical Society of Japan and published by Maruzen; "Theory Organic Chemistry Review (Riron Yuuki Kagaku Gaisetsu)" on p. 217, published by TOKYO KAGAKU DOZIN CO. LTD., and written by Tadao Nakatani; and Chemical Reviews, Vol. 91, No. 2, pp. 165-195 (1991).

In the formula, $A^1$ and $A^2$ independently represent a group selected from the group consisting of —O—, —NR— where R represents a hydrogen atom or a substituent, —S— and —CO—; and preferably, —O—, —NR— where R represents a substituent selected from those exemplified above as examples of $R^1$, or —S—.

In the formula, X represents a nonmetal atom selected from the groups atoms, provided that X may bind with at least one hydrogen atom or substituent. Preferably, X represents =O, =S, =NR or =C(R)R where R represents a substituent selected from those exemplified as examples of $R^1$.

In the formula, n is an integer from 0 to 2, and preferably 0 or 1.

Examples of the compound represented by formula (A) or (B) include, however are not limited to, those shown below. It is to be noted that a number in the parentheses, ( ), is used for specifying the exemplified compound as Compound (X) as far as there is no notation.

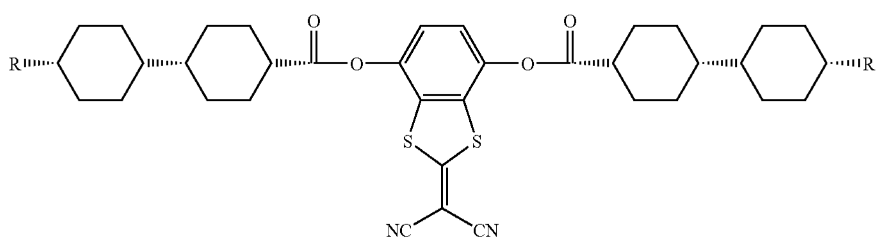

R = —$C_5H_{11}$ (1), —$C_4H_9$ (2), —$C_3H_7$ (3), —$C_2H_5$ (4)

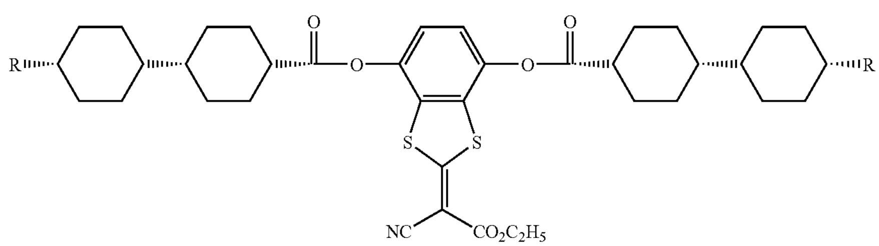

R = —$C_5H_{11}$ (5), —$C_4H_9$ (6), —$C_3H_7$ (7), —$C_2H_5$ (8)

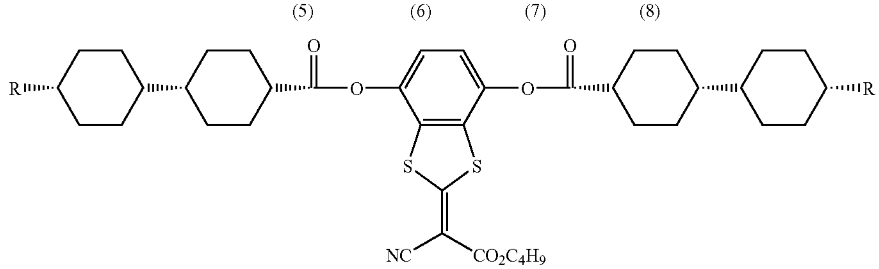

R = —$C_5H_{11}$ (9), —$C_4H_9$ (10), —$C_3H_7$ (11), —$C_2H_5$ (12)

-continued
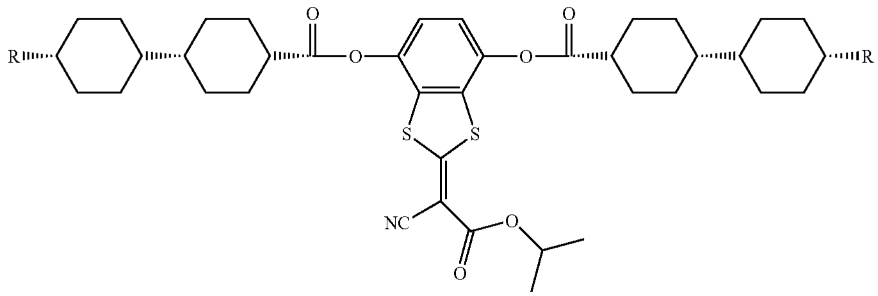
R = —$C_5H_{11}$ (13) —$C_4H_9$ (14) —$C_3H_7$ (15) —$C_2H_5$ (16)
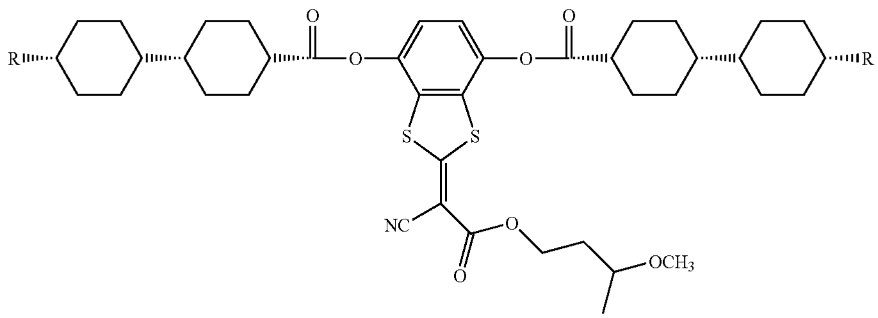
R = —$C_5H_{11}$ (17) —$C_4H_9$ (18) —$C_3H_7$ (19) —$C_2H_5$ (20)
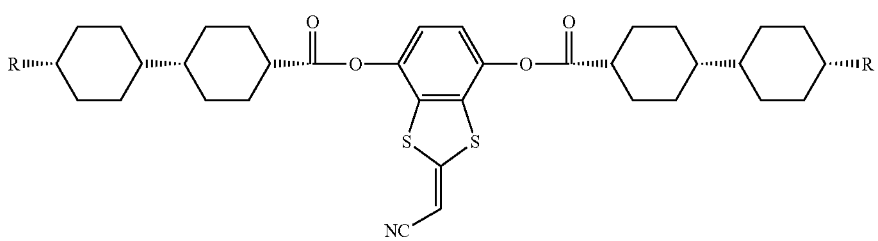
R = —$C_5H_{11}$ (21) —$C_4H_9$ (22) —$C_3H_7$ (23) —$C_2H_5$ (24)
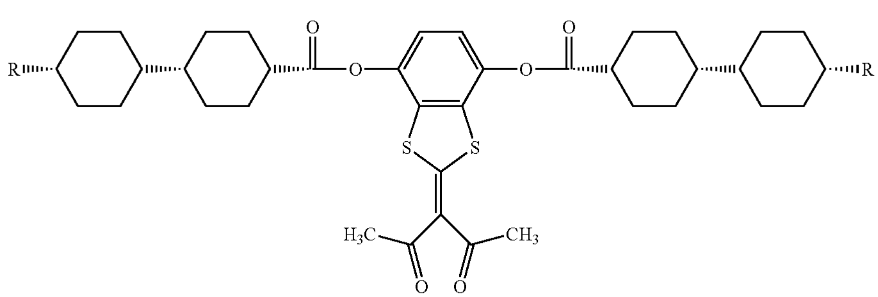
R = —$C_5H_{11}$ (25) —$C_4H_9$ (26) —$C_3H_7$ (27) —$C_2H_5$ (28)

-continued
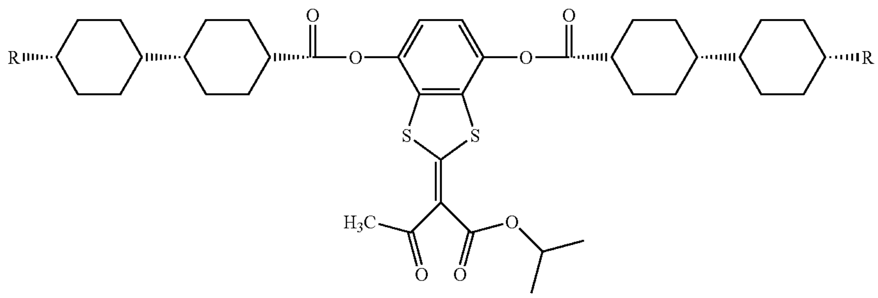
R = —$C_5H_{11}$ (29) —$C_4H_9$ (30) —$C_3H_7$ (31) —$C_2H_5$ (32)
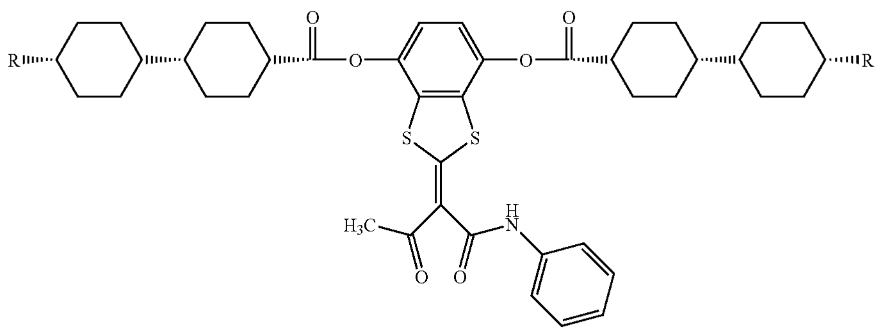
R = —$C_5H_{11}$ (33) —$C_4H_9$ (34) —$C_3H_7$ (35) —$C_2H_5$ (36)
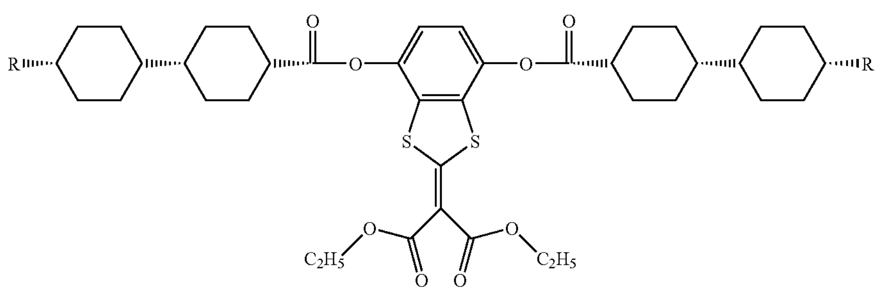
R = —$C_5H_{11}$ (37) —$C_4H_9$ (38) —$C_3H_7$ (39) —$C_2H_5$ (40)
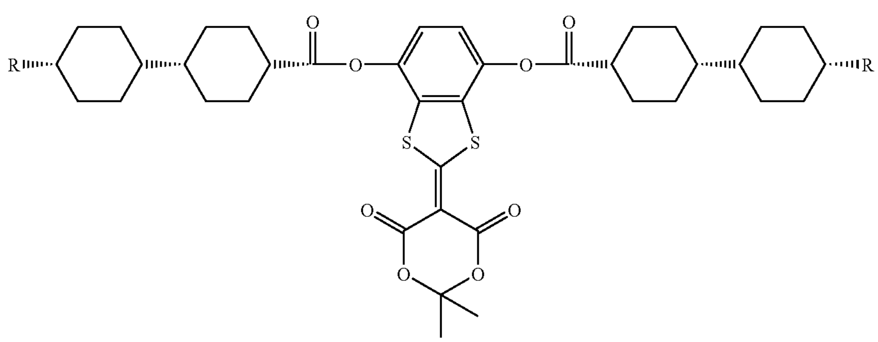
R = —$C_5H_{11}$ (41) —$C_4H_9$ (42) —$C_3H_7$ (43) —$C_2H_5$ (44)

-continued
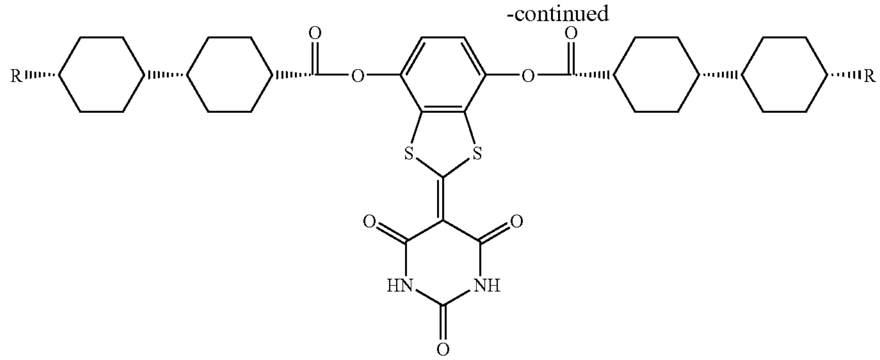
R = $—C_5H_{11}$ (45) $—C_4H_9$ (46) $—C_3H_7$ (47) $—C_2H_5$ (48)
(49)
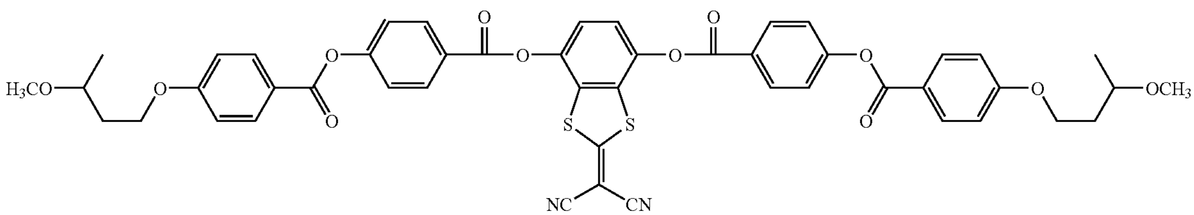
(50)
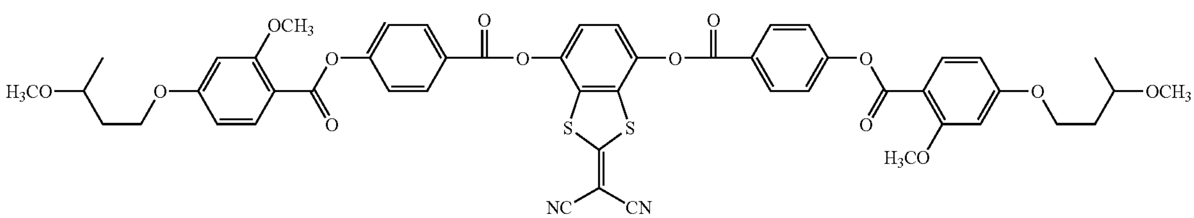
(51)
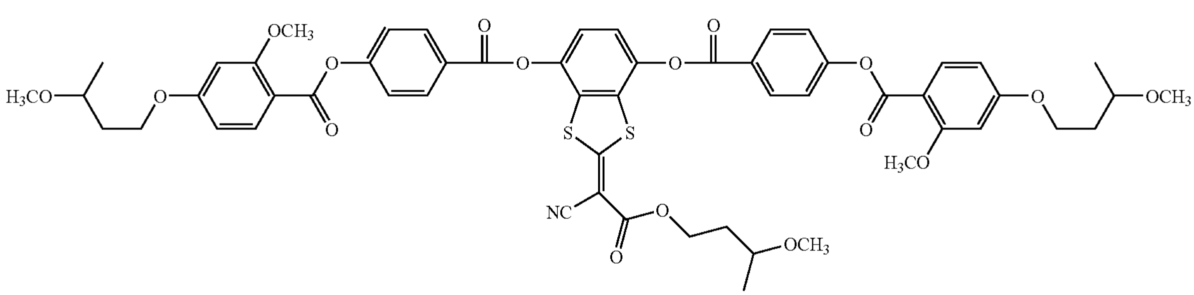
(52)
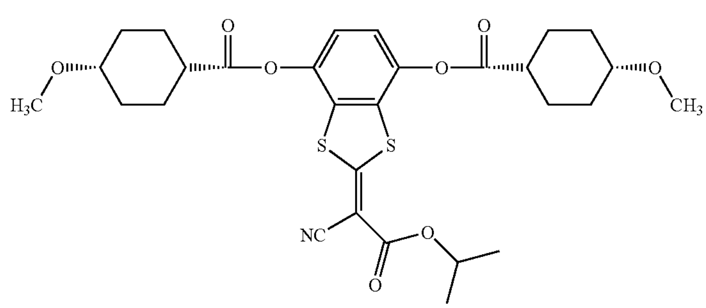

-continued
(53)
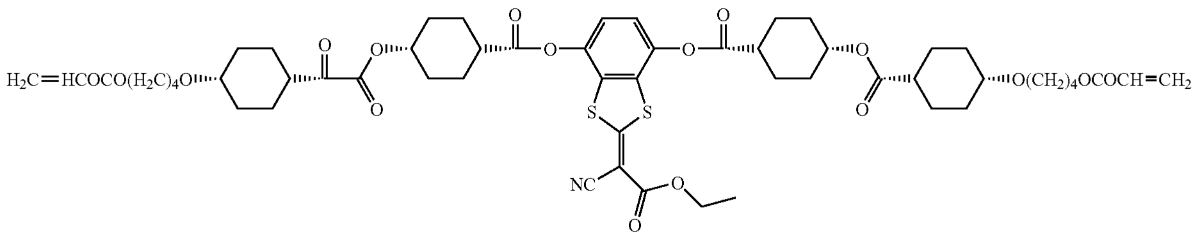
(54)
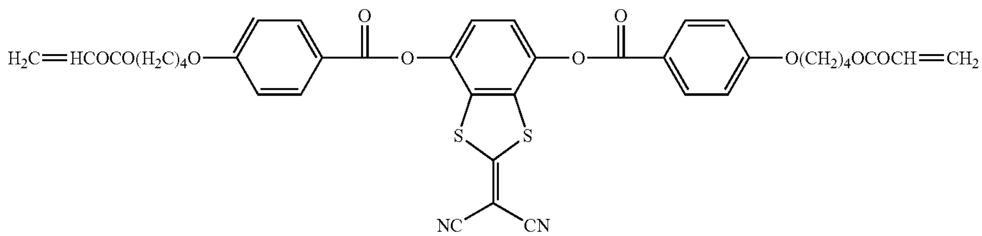
(55)
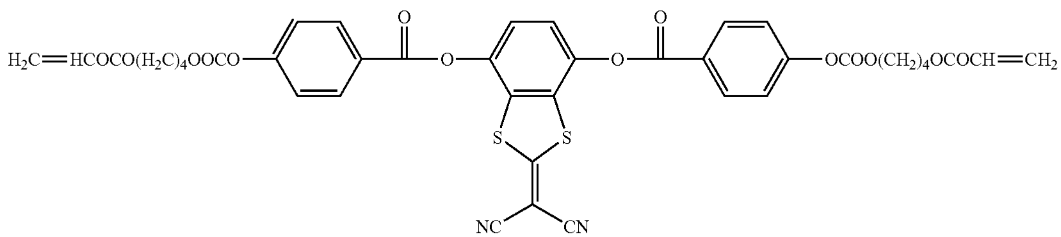
(56)
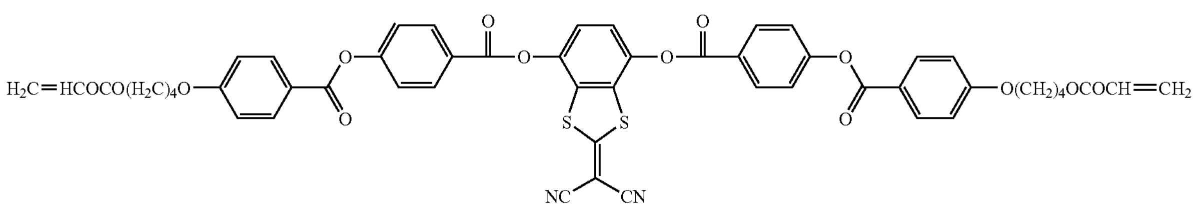
(57)
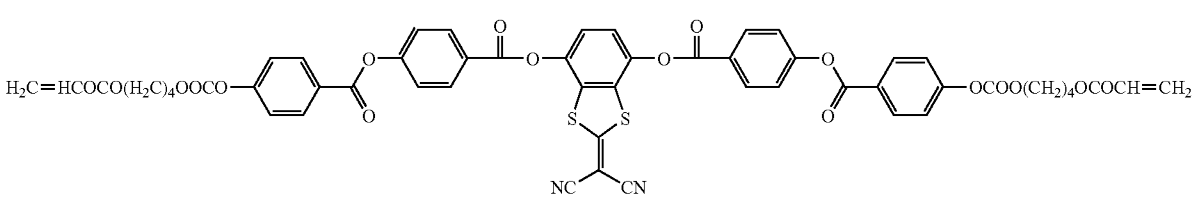
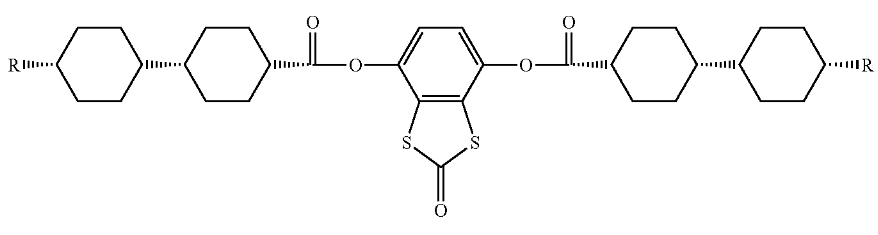
R = —$C_5H_{11}$ (58) —$C_4H_9$ (59) —$C_3H_7$ (60) —$C_2H_5$ (61)

-continued
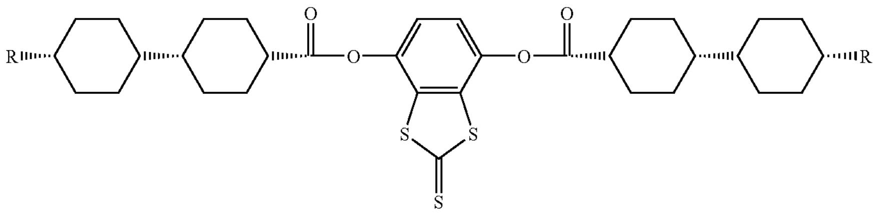
R = $-C_5H_{11}$ (62), $-C_4H_9$ (63), $-C_3H_7$ (64), $-C_2H_5$ (65)
(66)
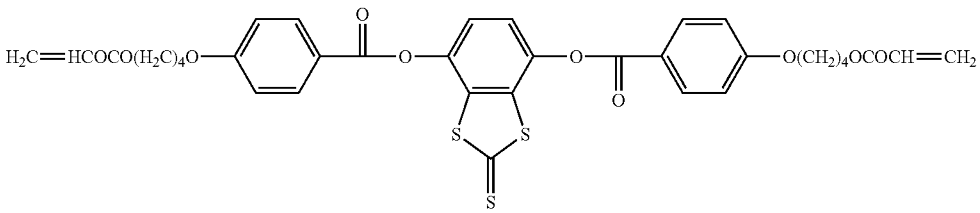
(67)
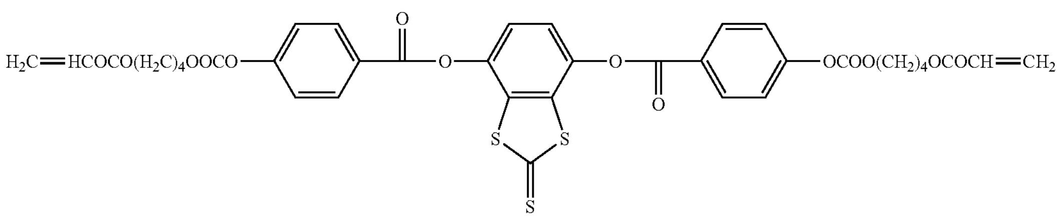
(68)
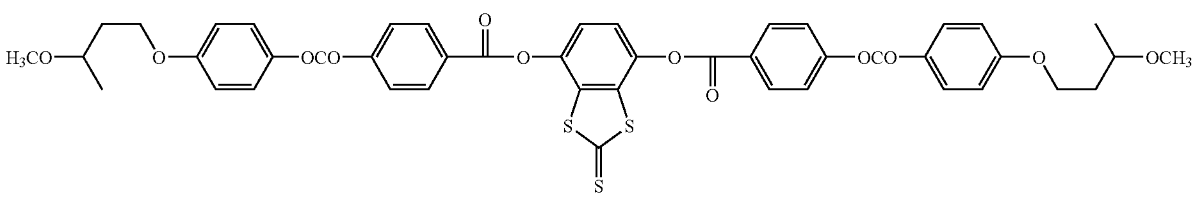
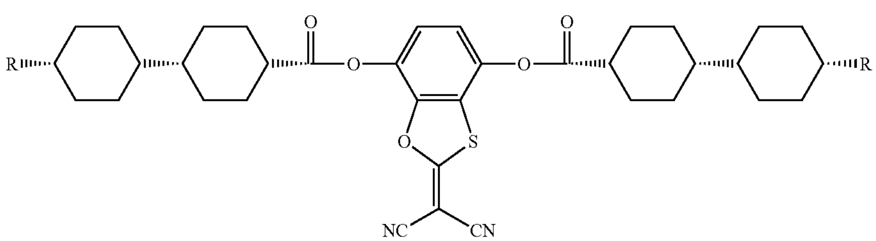
R = $-C_5H_{11}$ (69), $-C_4H_9$ (70), $-C_3H_7$ (71), $-C_2H_5$ (72)
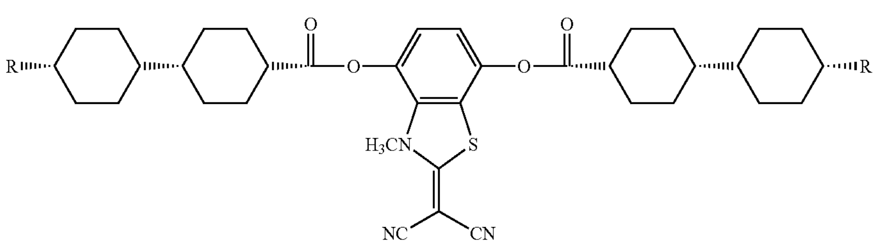
R = $-C_5H_{11}$ (73), $-C_4H_9$ (74), $-C_3H_7$ (75), $-C_2H_5$ (76)

-continued
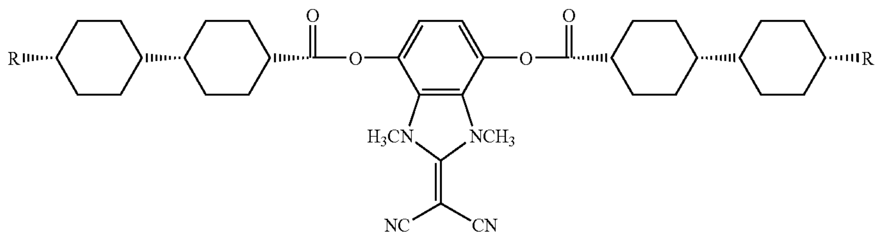
R = —$C_5H_{11}$ (77) —$C_4H_9$ (78) —$C_3H_7$ (79) —$C_2H_5$ (80)
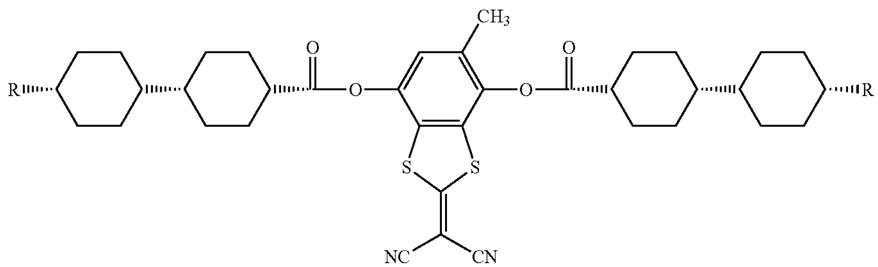
R = —$C_5H_{11}$ (81) —$C_4H_9$ (82) —$C_3H_7$ (83) —$C_2H_5$ (84)
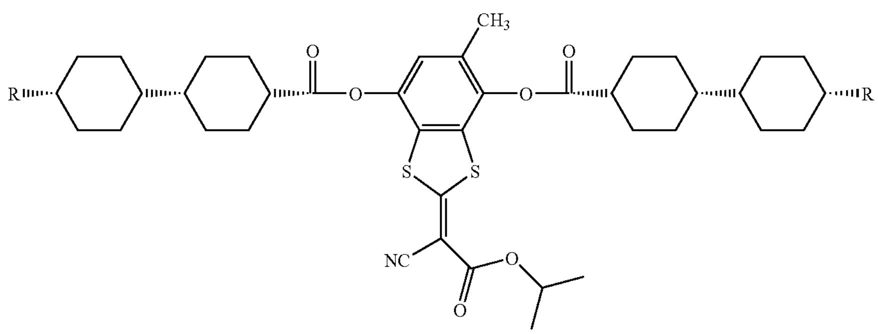
R = —$C_5H_{11}$ (85) —$C_4H_9$ (86) —$C_3H_7$ (87) —$C_2H_5$ (88)
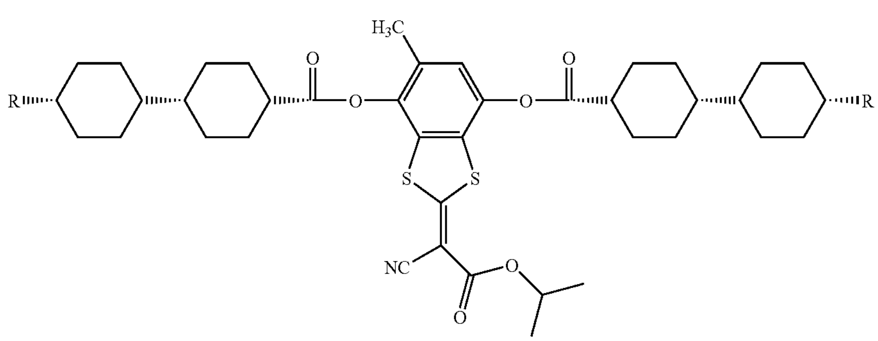
R = —$C_5H_{11}$ (89) —$C_4H_9$ (90) —$C_3H_7$ (91) —$C_2H_5$ (92)

-continued
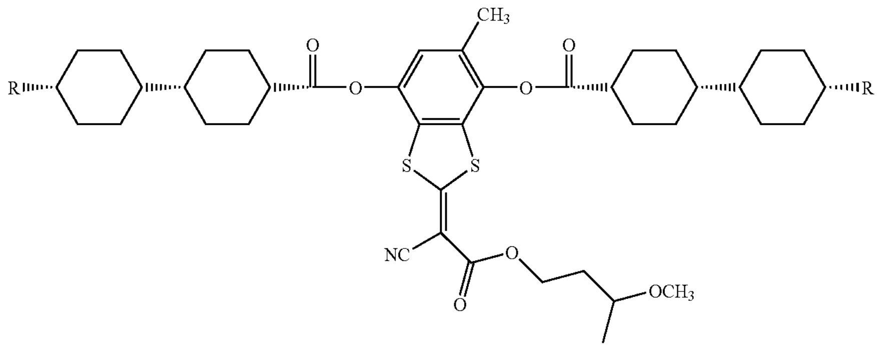
R = —$C_5H_{11}$ —$C_4H_9$ —$C_3H_7$ —$C_2H_5$
(93) (94) (95) (96)
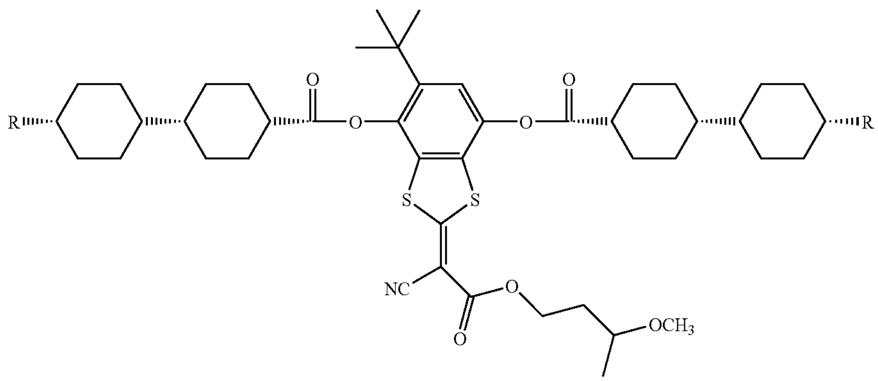
R = —$C_5H_{11}$ —$C_4H_9$ —$C_3H_7$ —$C_2H_5$
(97) (98) (99) (100)
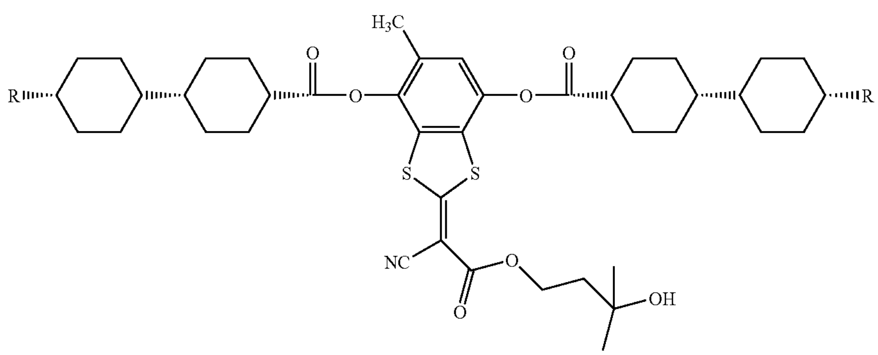
R = —$C_5H_{11}$ —$C_4H_9$ —$C_3H_7$ —$C_2H_5$
(101) (102) (103) (104)
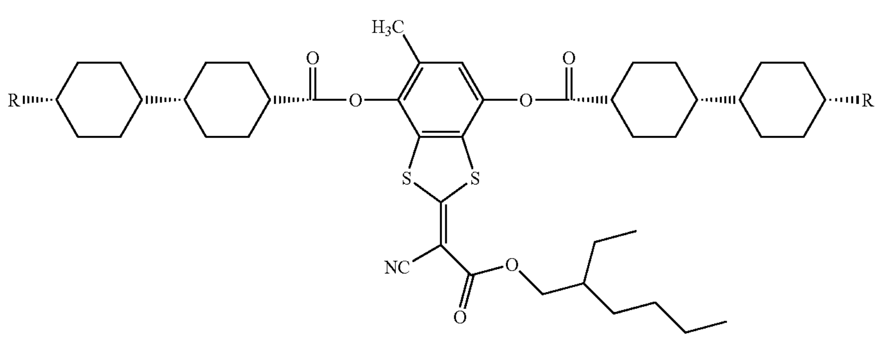
R = —$C_5H_{11}$ —$C_4H_9$ —$C_3H_7$ —$C_2H_5$
(105) (106) (107) (108)

-continued

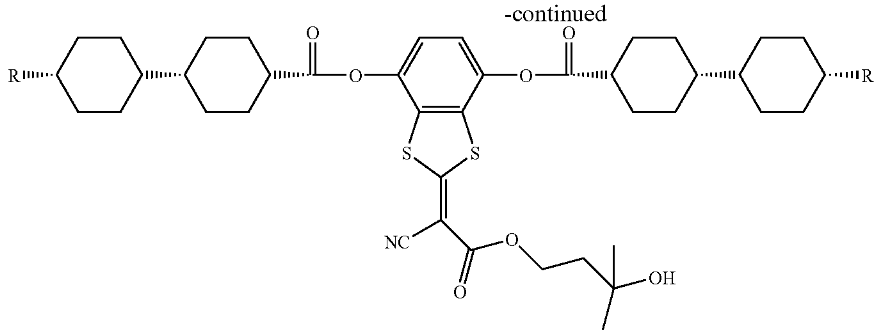

R = —$C_5H_{11}$ (109) —$C_4H_9$ (110) —$C_3H_7$ (111) —$C_2H_5$ (112)

The compound represented by the formula (A) or (B) may be synthesized referring to known methods. For example, Example Compound (1) may be synthesized according to the following scheme.

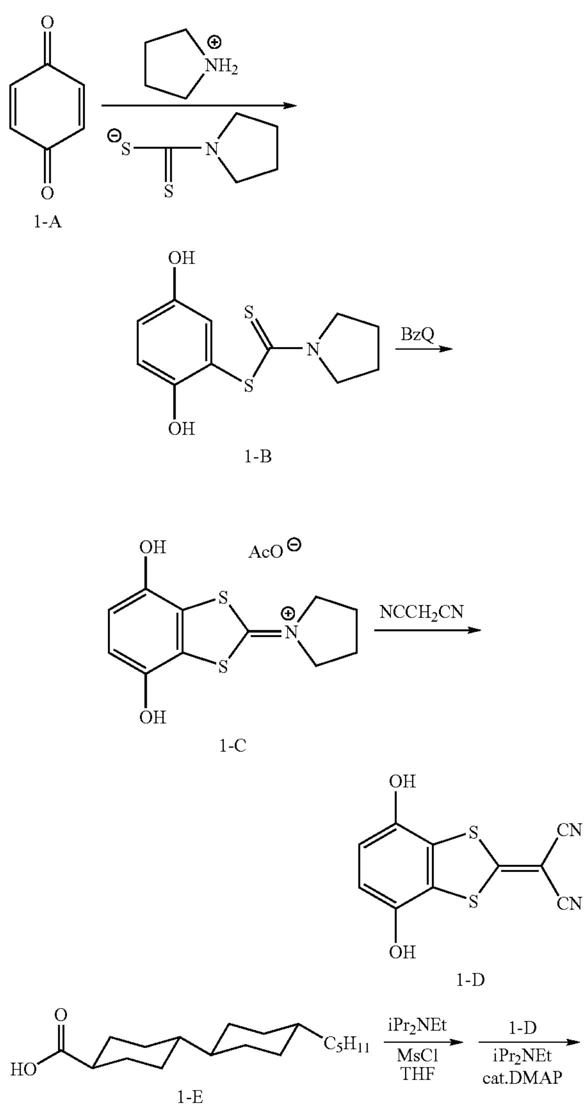

-continued

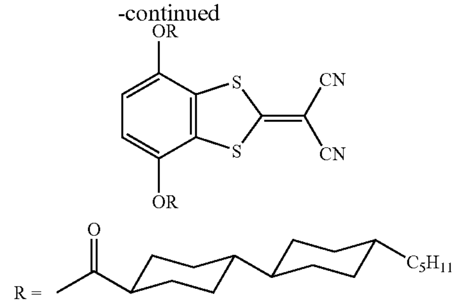

Example Compound (1)

In the above scheme, the steps for producing Compound (1-d) from Compound (1-A) may be carried out referring to the description in "Journal of Chemical Crystallography" (1997); 27(9); p. 515-526.

As shown in the above scheme, Compound (1) may be produced as follows. A tetrahydrofuran solution of Compound (1-E) is added with methanesulfonic acid chloride, added dropwise with N,N-di-iso-propylethylamine and then stirred. After that, the reaction solution is added with N,N-di-iso-propylethylamine, added dropwise with a tetrahydrofuran of Compound (1-D), and then added dropewise with a tetrahydrofuran solution of N,N-dimethylamino pyridine (DMAP).

Rod-Like Compound:

The cellulose acylate film used as the retardation film A or B preferably contains at least one rod-like compound represented by formula (a) in place of or together with liquid crystal compound (preferably the liquid crystal compound represented by formula (A)). The rod like compound may be selected from liquid crystal compounds or non-liquid crystal compounds; and liquid crystal compounds are preferable. The rod-like compound may contribute to enhancing retardation since its molecules are aligned with molecules of the liquid crystal compound, and further may contribute to improving solubility of the liquid crystal compound in the film.

$$Ar^1\text{-}L^{12}\text{-}X\text{-}L^{13}\text{-}Ar^2 \qquad \text{Formula (a):}$$

In the formula (a), $Ar^1$ and $Ar^2$ independently represent an aromatic group; $L^{12}$ and $L^{13}$ independently represent —O—CO— or —CO—O—; and X represents 1,4-cyclohexylen, vinylene or ethynylene.

In the description, the term "aromatic group" is used for any aryl groups (aromatic hydrocarbon groups), substituted aryl groups, aromatic heterocyclic groups and substituted aromatic heterocyclic groups.

Aryl groups and substituted aryl groups are preferred to heterocyclic groups and substituted heterocyclic groups. The hetero rings in the aromatic heterocyclic groups are generally unsaturated. The hetero-rings are preferably 5-, 6- or 7-membered rings. The hetero-rings in the aromatic heterocyclic groups generally have the maximum number of double bonds. The hetero atom(s) embedded in the hetero-ring is preferably selected from the group consisting of nitrogen, oxygen and sulfur atoms, and is more preferably a nitrogen or sulfur atom.

Examples of the aromatic group include radicals of a benzene ring, furan ring, thiophene ring, pyrrole ring, oxazole ring, thiazole ring, imidazole ring, triazole ring, pyridine ring, pyrimidine ring and pyrazine ring; and a radical of a benzene ring, phenyl, is more preferable.

Examples of the substituent in the substituted aryl group or substituted heterocyclic group include halogen atoms (F, Cl, Br and I), hydroxyl, carboxyl, cyano, amino, alkylaminos such as methyl amino, ethylamino, butylamino and dimethylamino; nitro, sulfo, carbamoyl, alkylcarbamoys such as N-methyl carbamoyl, N-ethyl carbamoyl and N,N-dimethyl carbamoyl; sulfamoyl, alkylsulfamoyls such as N-methyl sulfamoyl, N-ethyl sulfamoyl and N,N-dimethyl sulfamoyl; ureido, alkylureidos such as N-methyl ureido, N,N-dimethyl ureido, and N,N,N'-trimethyl ureido; alkyls such as methyl, ethyl, propyl, butyl, pentyl, heptyl, octyl, isopropyl, s-butyl, t-amyl, cyclohexyl and cyclopentyl; alkenyls such as vinyl, allyl and hexenyl; alkynyls such as ethynyl and butynyl; acyls such as formyl, acetyl, butyryl, hexanoyl and lauryl; acyloxys such as acetoxy, butyryloxy, hexanoyloxy and lauryloxy; alkoxys such as methoxy, ethoxy, propoxy, butoxy, pentyloxy, heptyloxy and octyloxy; aryloxys such as phenoxy; alkoxycarbonyls such as methoxycarbonyl, ethoxycarbonyl, propoxycarbonyl, butoxycarbonyl, pentyloxycarbonyl and heptyloxycarbonyl; aryloxycarbonyls such as phenoxycarbonyl; alkoxycarbonylaminos such as butoxy carbonylamino and hexyloxy carbonylamino; alkylthios such as methylthio, ethylthio, propylthio, butylthio, pentylthio, heptylthio and octylthio; arylthios such as phenylthio; alkylsulfonyls such as methylsulfonyl, ethylsulfonyl, propylsulfonyl, butylsulfonyl, pentylsulfonyl, heptylsulfonyl and octylsulfonyl; amidos such as acetoamido, butylamido, hexylamido and laurylamido; and non-aromatic heterocyclic groups such as morpholino and pyrazinyl.

As the substituent in the substituted aryl groups or the substituted aromatic heterocyclic groups, halogen atoms, cyano, carboxyl, hydroxyl, amino, alkyl-substituted aminos, acyl, acyloxys, amidos, alkoxycarbonyls, alkoxys, alkylthios and alkyls are preferable.

The alkyl moieties in the alkylaminos, alkoxycarbonyls, alkoxys and alkylthios, and alkyls may have one or mote substituents. Examples of the substituent in the alkyl moieties or alkyls include halogen atoms, hydroxyl, carboxyl, cyano, amino, alkylaminos, nitro, sulfo, carbamoyl, alkylcarbamoyls, sulfamoyl, alkylsulfamoyls, ureido, alkylureidos, alkenyls, alkynyls, acyls, acyloxys, acylaminos, alkoxys, aryloxys, alkoxycarbonyls, aryloxycarbonyls, alkoxycarbonylaminos, alkylthios, arylthios, alkylsulfonyls, amidos and non-aromatic heterocyclic groups. As the substituent in the alkyl moieties or alkyls, halogen atoms, hydroxyl, amino, alkylaminos, acyls, acyloxys, acylaminos, alkoxycarbonyls and alkoxys are preferable.

In formula (a), $L^{12}$ and $L^{13}$ each independently represent a divalent group selected from the group consisting of —O—CO—, —CO—O— and any combinations thereof.

In formula (a), X represents 1,4-cyclohexylene, vinylene or ethynylene.

Examples of the compound represented by formula (a) are shown below.

a-(1)

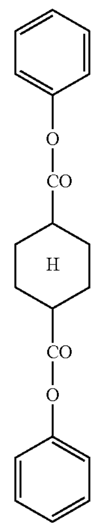

a-(2)

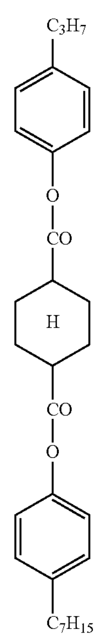

-continued
a-(3)
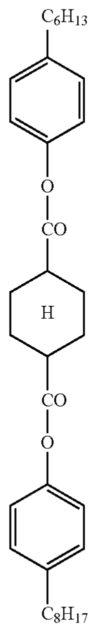
a-(4)
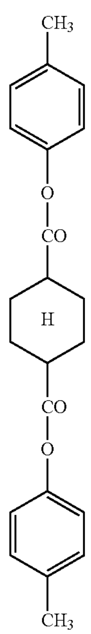
-continued
a-(5)
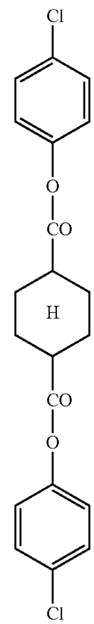
a-(6)
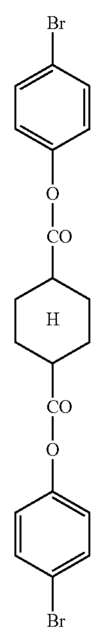

-continued
a-(7)
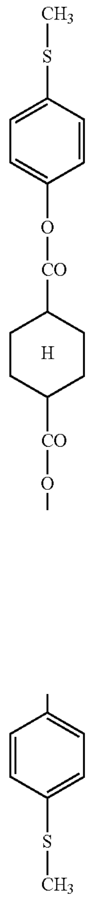
a-(8)
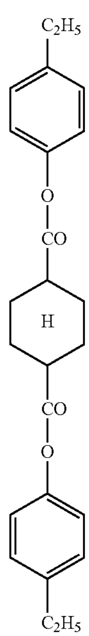
-continued
a-(9)
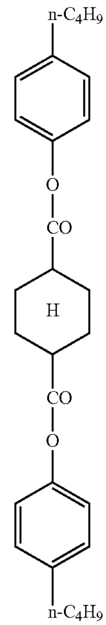
a-(10)
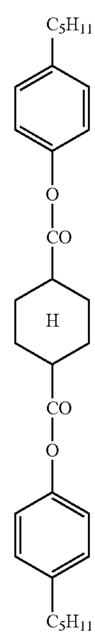

-continued
a-(11)
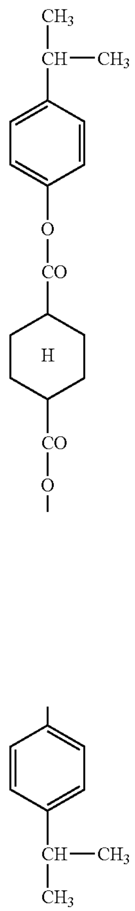
a-(12)
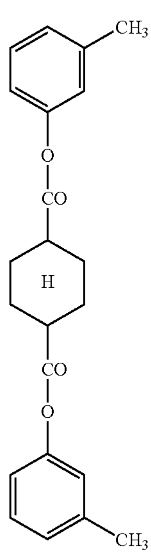
-continued
a-(13)
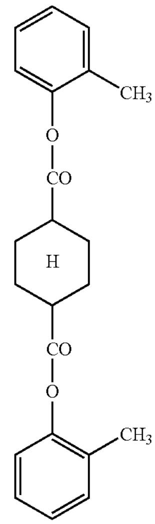
a-(14)
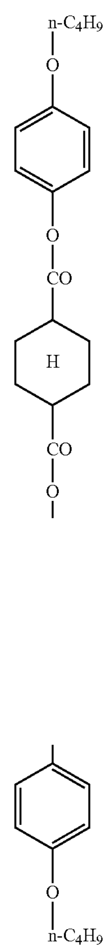

-continued
a-(15)
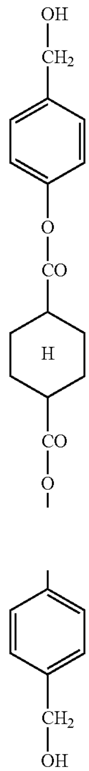
a-(16)
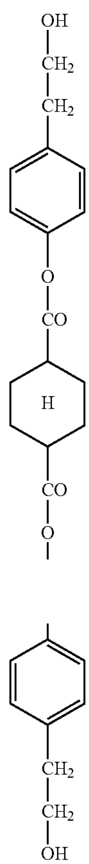
-continued
a-(17)
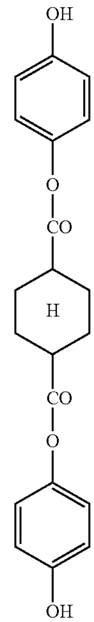
a-(18)
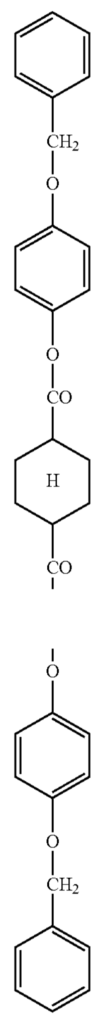

-continued
a-(19)
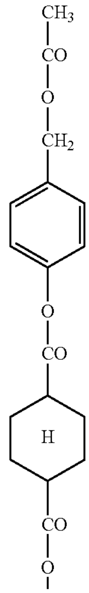
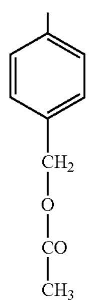
a-(20)
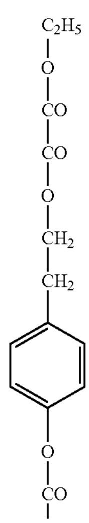
-continued
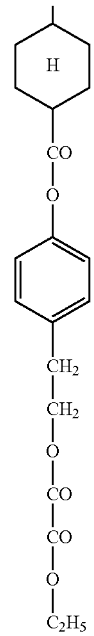
a-(21)
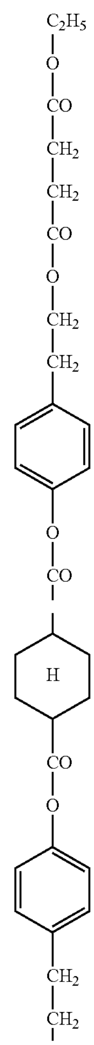

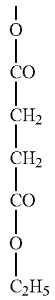
a-(22)
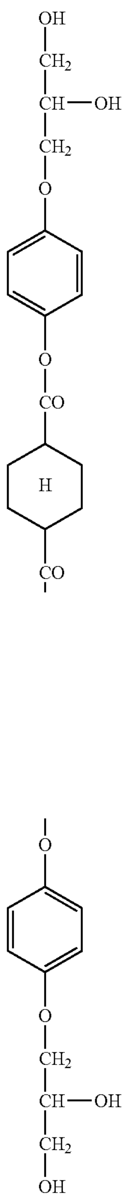
a-(23)
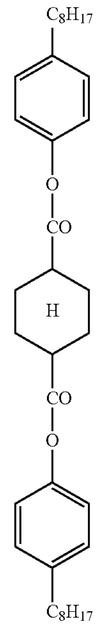
a-(24)
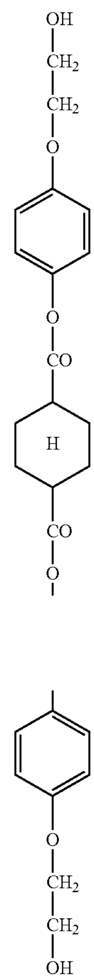

-continued
a-(25)
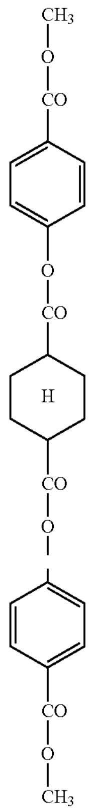
a-(26)
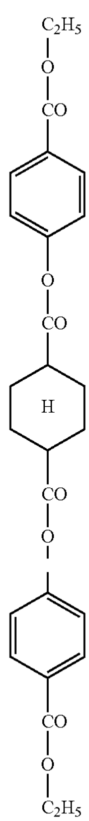
-continued
a-(27)
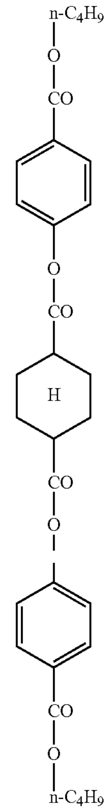
a-(28)
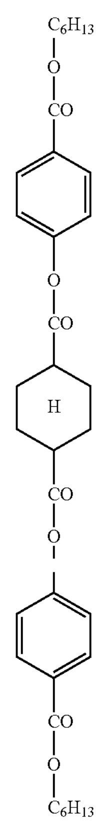

-continued
a-(29)
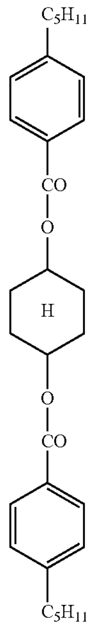
a-(30)
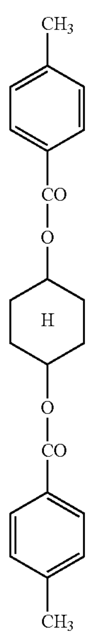
-continued
a-(31)
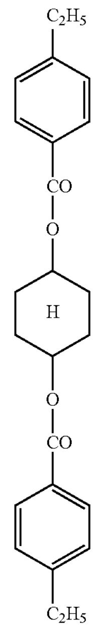
a-(32)
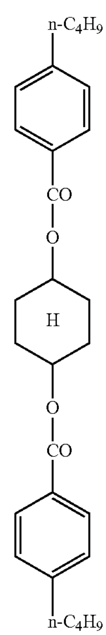

-continued
a-(33)
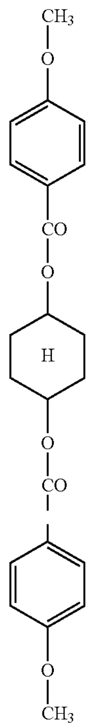
a-(34)
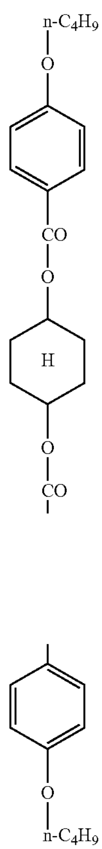
-continued
a-(35)
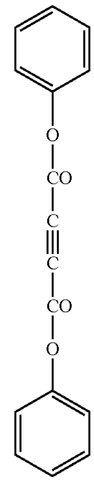
a-(36)
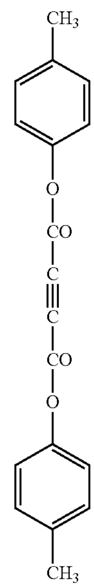
a-(37)
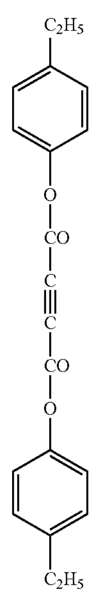

-continued
a-(38)
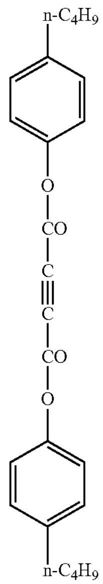
a-(39)
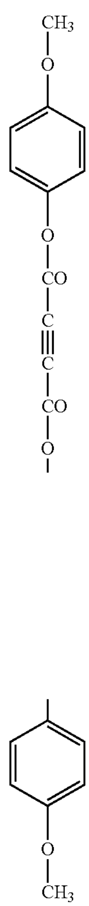
-continued
a-(40)
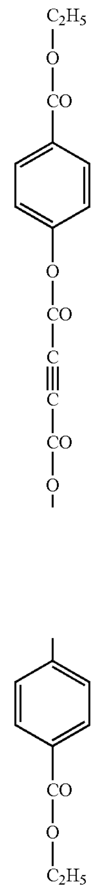
a-(41)
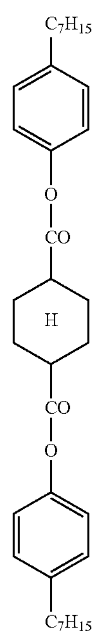

-continued a-(42)

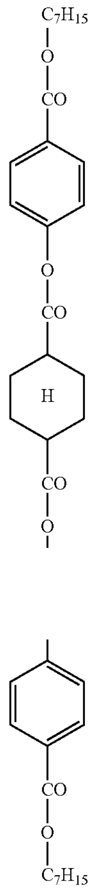

a-(43)

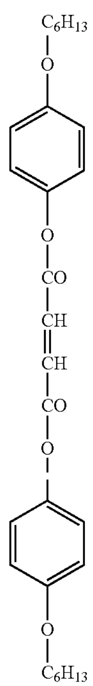

-continued a-(44)

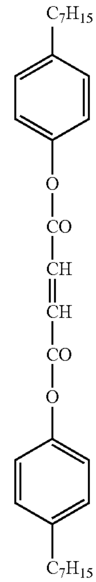

a-(45)

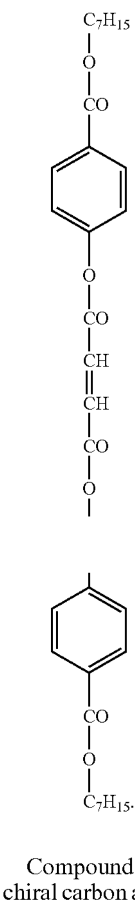

Compounds a-(1) to a(34), a-(41) and a-(42) have two chiral carbon atoms at the 1- and 4-positions of a cyclohexane ring. Although Compounds a-(1), a-(4) to a-(34), a-(41) and a-(42) have geometric isomers trans- and cis-forms), they have no enantiomer (show no optical activity) because they have a optical symmetric meso-type molecular structure. Regarding Compound a-(1), trans- and cis-forms are shown below.

(1-trans)

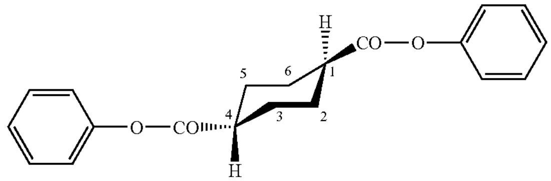

(1-cis)

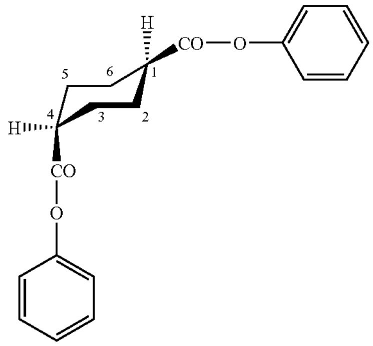

As described above, the rod-like compound is preferably selected from compounds having linear molecular structure. Therefore, trans-substances are preferred to cis-substances.

Compounds a-(2) and a-(3) have four types of isomers including not only geometric isomers but also enantiomers. Among the geometric isomers, trans-substances are preferred to cis-substances. Enantiomers such as D-, L- and racemic-substances are nearly equally preferred.

Compounds a-(43) to a-(45) have trans- and cis-forms with a vinylene bond as a center. Because of the same reason, trans-substances are preferred to the cis-substances.

In the invention, the liquid crystal compound may be selected from compounds having a polymerizable group which are polymerizable or curable under irradiation of light or heat. Such a compound may be aligned in the film, and then polymerize, to thereby be in a stable state in the film.

The polymerizable liquid crystal compound may be used with a low-molecular weight compound(s) such as photo-polymerization initiator.

Molecules of the liquid crystal compound in the film are aligned with a degree of orientation higher than that of molecules of the cellulose acylate contained in the film as a major ingredient; and therefore, by using a liquid crystal compound as an Re enhancer, the film showing higher Re can be obtained. The liquid crystal compound to be used as an Re enhancer may be added to the cellulose acylate composition with one or more additives, which are optionally used. Preferably, the liquid crystal compound is dissolved in an organic solvent such as alcohol, methylene chloride and dioxolane once; and then the solution is added to the polymer solution (preferably cellulose acylate solution). The amount of the liquid crystal compound is preferably from 5 to 100% by mass, and more preferably from 50 to 100% by mass with respect to the total mass of all of the additives. And the amount of the liquid crystal compound is preferably from 0.1 to 30% by mass, more preferably from 0.5 to 20% by mass, and even more preferably from 1 to 10% by mass with respect to the total mass of the cellulose acylate composition.

In the embodiments employing the cellulose acylate composition containing not only the liquid crystal compound but also the rod-like compound, the amount of the rod-like compound is preferably from 0.1 to 30% by mass, more preferably from 0.5 to 20% by mass and even more preferably from 1 to 10% by mass with respect to the total mass of the cellulose acylate composition.

In the embodiments employing the cellulose acylate composition containing not only the liquid crystal compound but also the discotic compound, the amount of the rod-like compound is preferably from 0.1 to 30% by mass, more preferably from 0.5 to 20% by mass and even more preferably from 1 to 10% by mass with respect to the total mass of the cellulose acylate composition.

In the invention, the thickness of the retardation film A or B is not limited to any specific range, and, in terms of thinning, the thickness is preferably equal to or less than 100 μm, more preferably equal to or less than 80 μm, and even more preferably equal to or less than 60 μm. In terms of thinning, the less thickness is more preferable; however, generally, the thickness of a polymer film is equal to or more than 30 μm.

One example of the retardation film to be used in the invention is a retardation film having the reversed wavelength dispersion characteristics of both of Re and Rth. The retardation films having the reversed wavelength dispersion characteristics of both of Re and Rth may be prepared by using the cellulose acylate composition containing at least one compound represented by formula (A).

Rth Enhancer

In order to prepare a cellulose acylate film which satisfies the conditions of the retardation films to be used in the invention, an Rth enhancer is preferably added to the cellulose acylate film. Here, the term of Rth enhancer is used for any compounds having a property which enhances birefringence along thickness direction of the film.

As the Rth enhancer, a compound having large polarizability anisotropy having an absorption maximum in a wavelength range of 250 nm to 380 nm is preferred. The compounds represented by formula (I) are preferably used as the Rth enhancer.

(I)

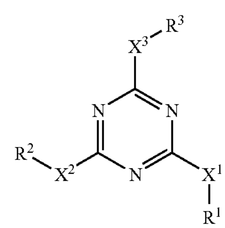

In the formula, $X^1$ represents a single bond, —$NR^4$—, —O— or —S—; $X^2$ represents a single bond, —$NR^5$—, —O— or —S—; $X^3$ represents a single bond, —$NR^6$—, —O— or —S—. And, $R^1$, $R^2$, and $R^3$ independently represent an alkyl group, an alkenyl group, an aromatic ring group or a hetero-ring group; $R^4$, $R^5$ and $R^6$ independently represent a hydrogen atom, an alkyl group, an alkenyl group, an aryl group or a hetero-ring group.

Examples of the compound represented by formula (I) include, however are not limited to, those shown below.

-continued
I-(1)
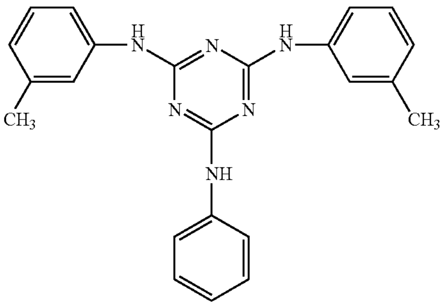
I-(2)
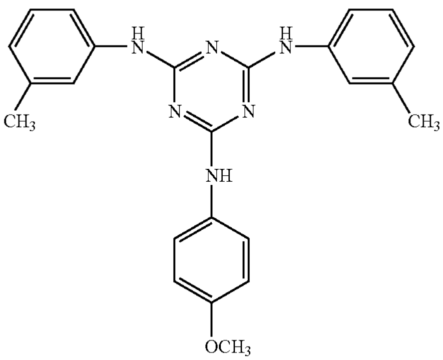
I-(3)
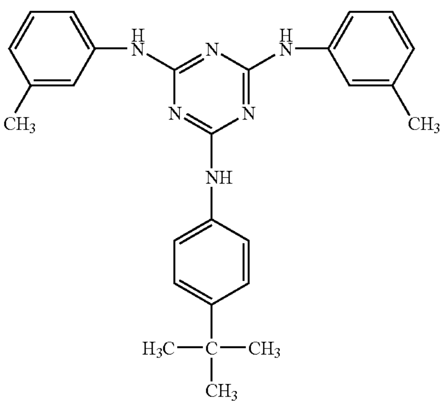
I-(4)
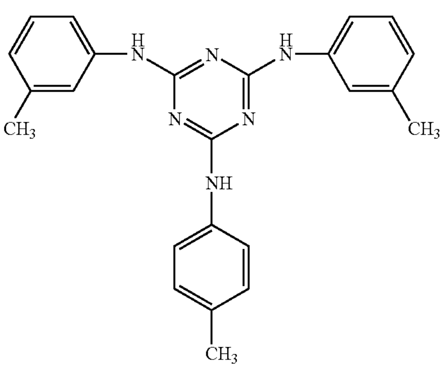
I-(5)
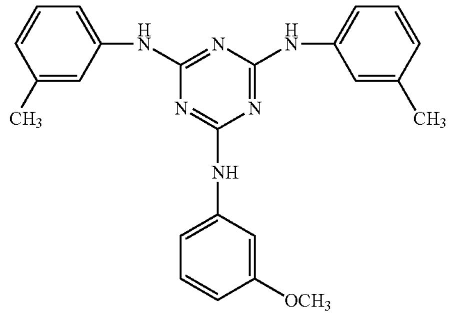
I-(6)
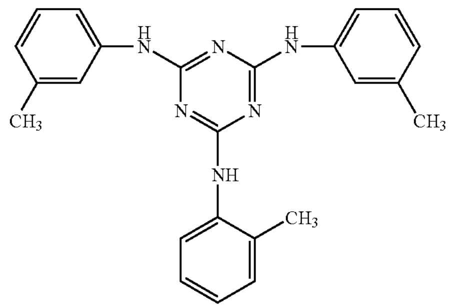
I-(7)
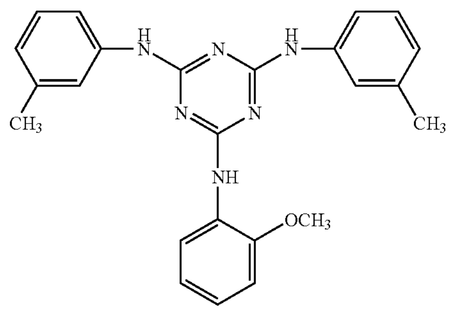
I-(8)
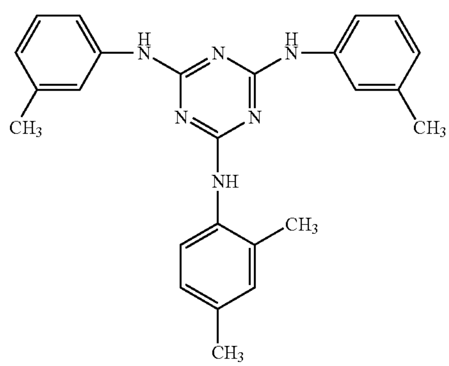
I-(9)
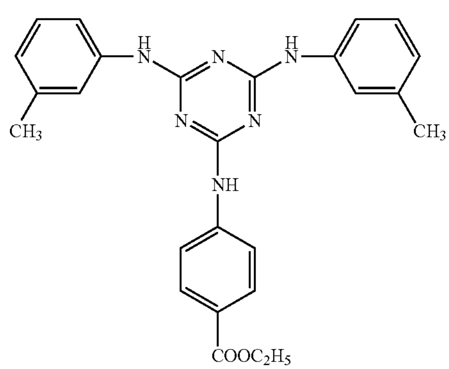

-continued
I-(10)
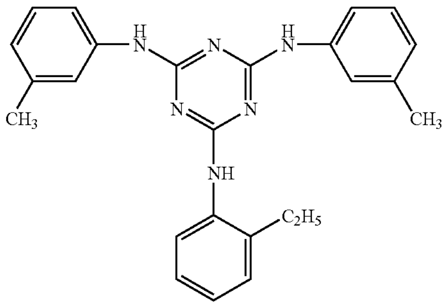
I-(11)
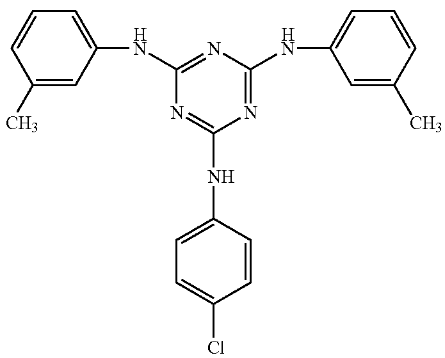
I-(12)
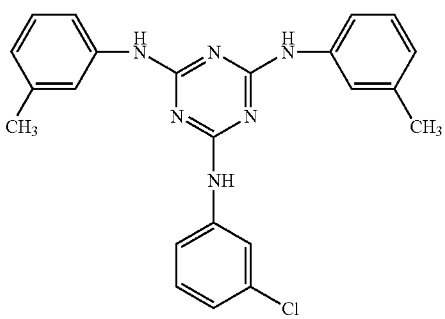
I-(13)
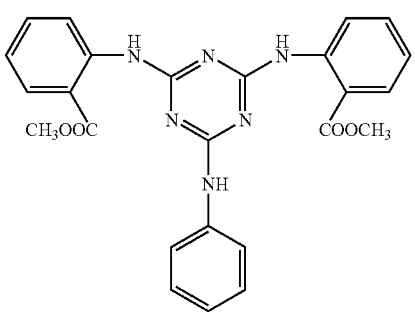
I-(14)
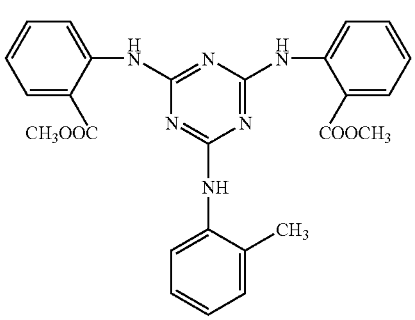
-continued
I-(15)
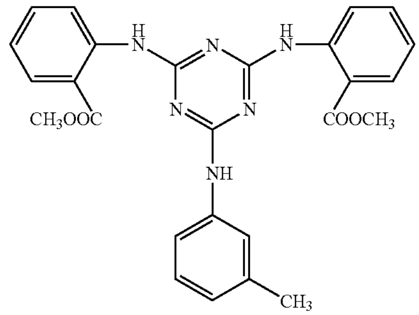
I-(16)
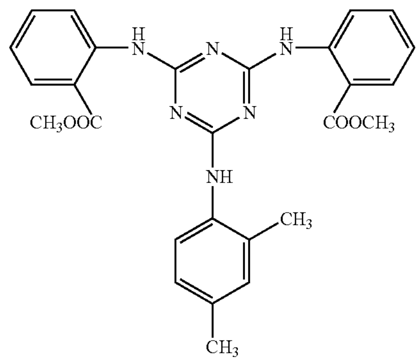
I-(17)
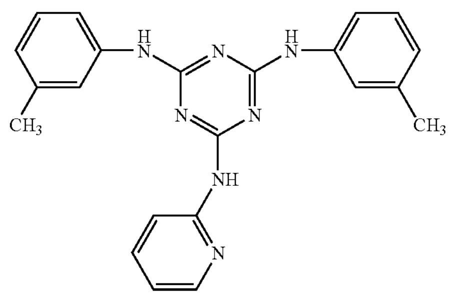
I-(18)
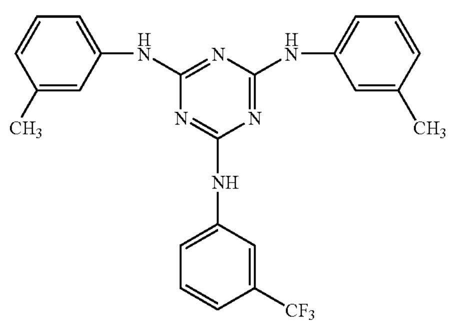
I-(19)
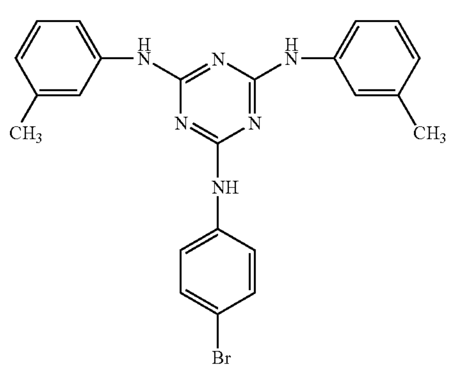

-continued
I-(20)
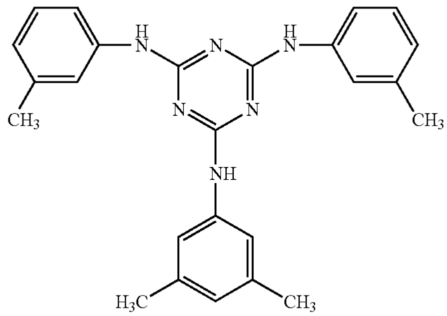
I-(21)
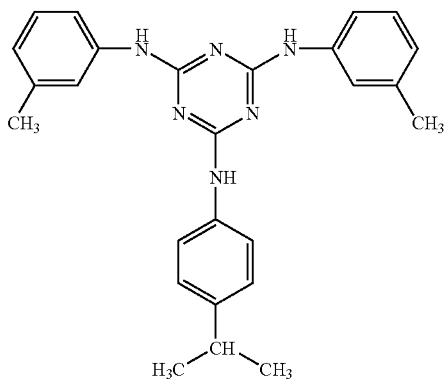
I-(22)
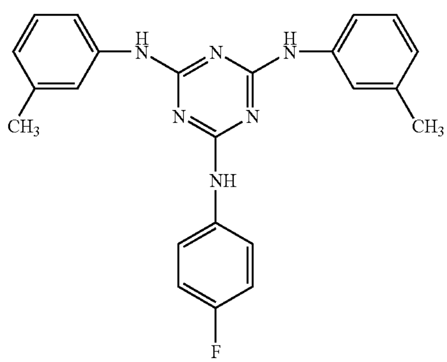
I-(23)
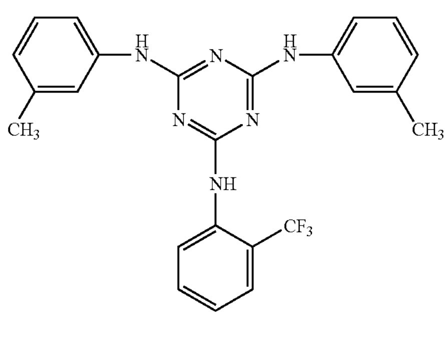
-continued
I-(24)
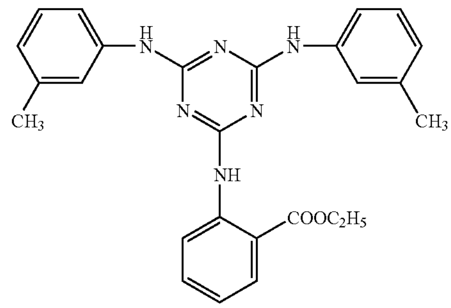
I-(25)
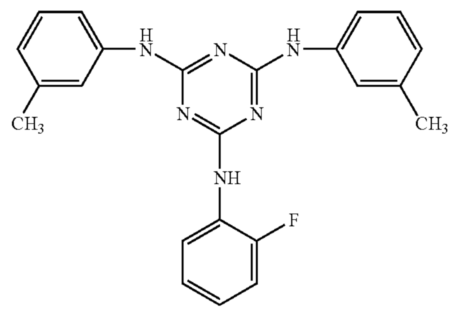
I-(26)
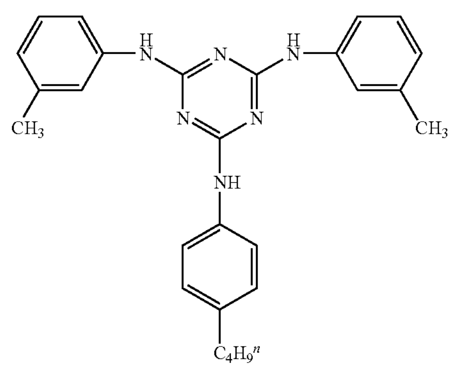
I-(27)
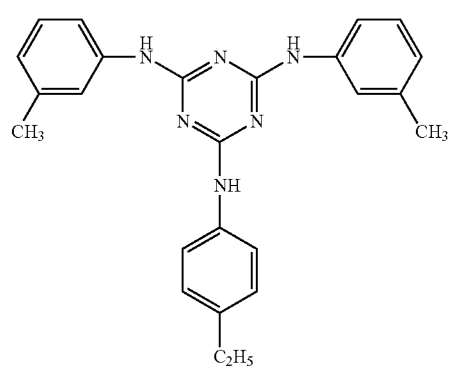

-continued
I-(28)
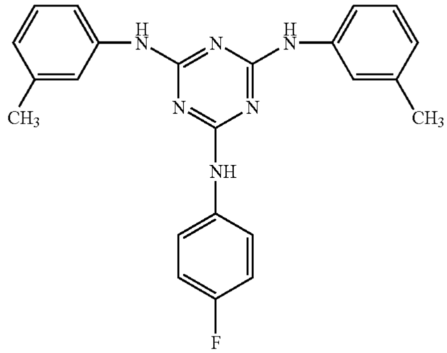
I-(29)
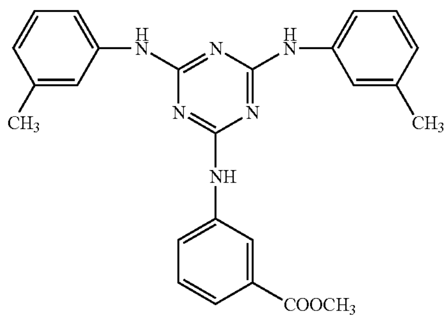
I-(30)
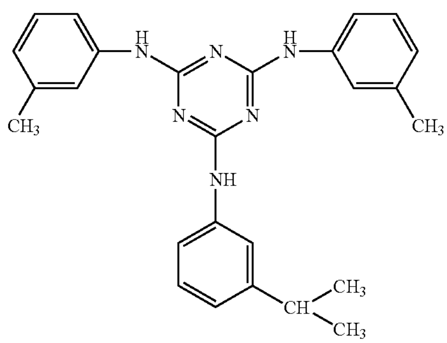
I-(31)
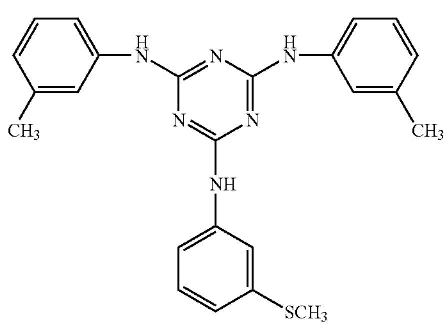
-continued
I-(32)
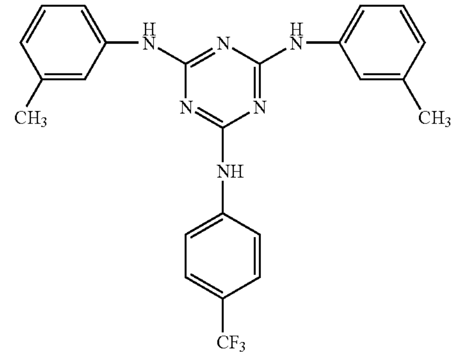
I-(33)
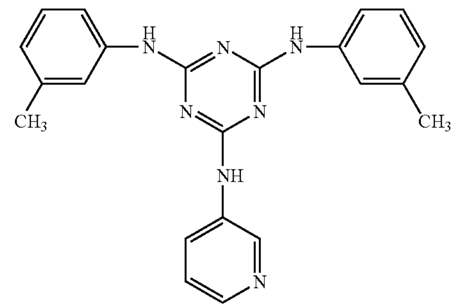
I-(34)
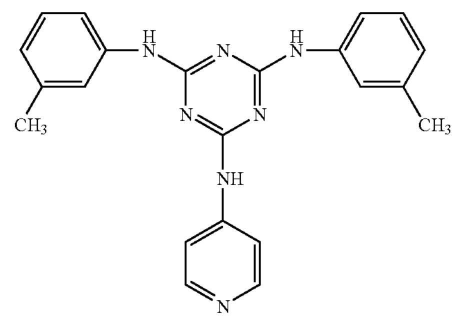
I-(35)
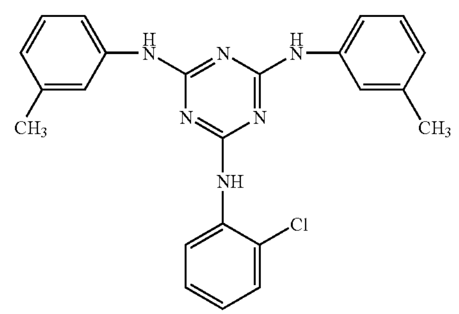
I-(36)
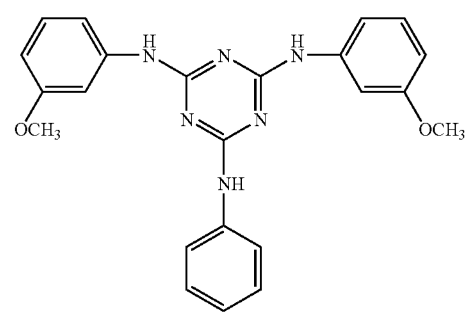

-continued
I-(37)
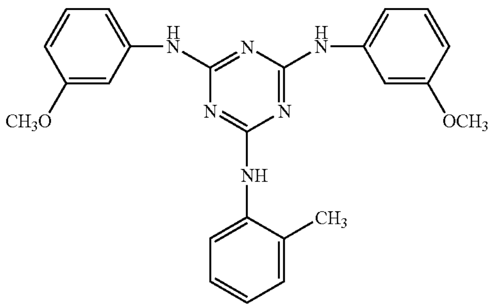
I-(38)
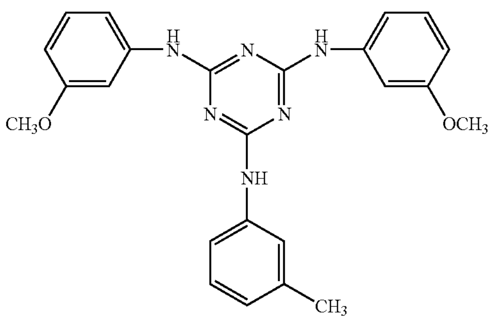
I-(39)
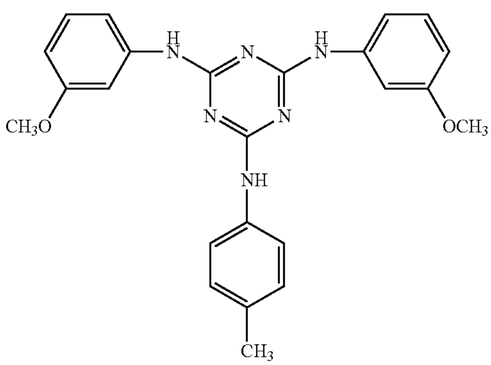
I-(40)
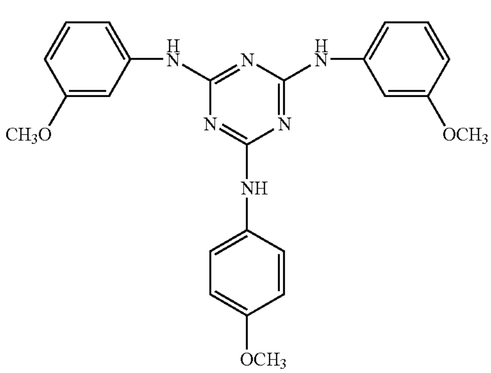
-continued
I-(49)
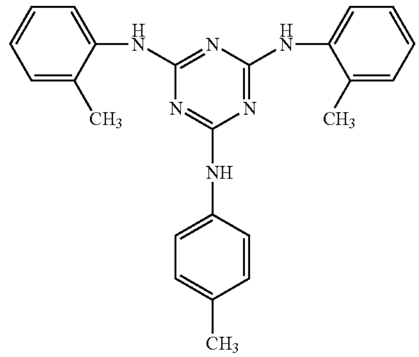
I-(50)
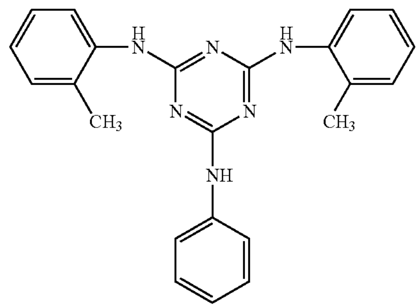
II-(1)
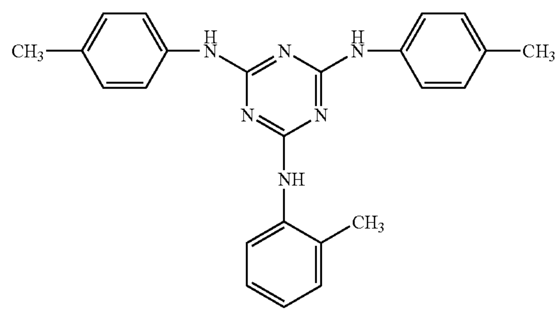
II-(2)
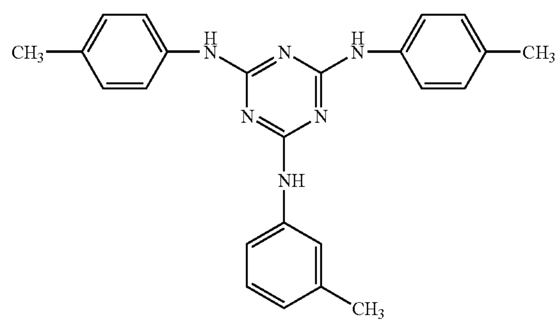
II-(3)
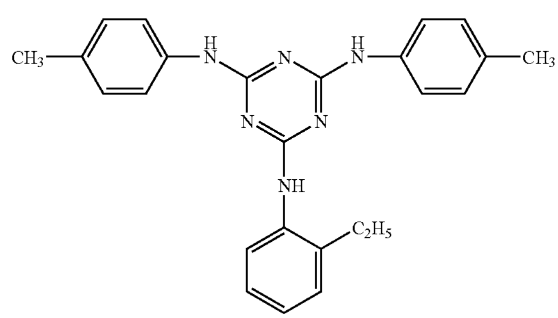

-continued
II-(4)
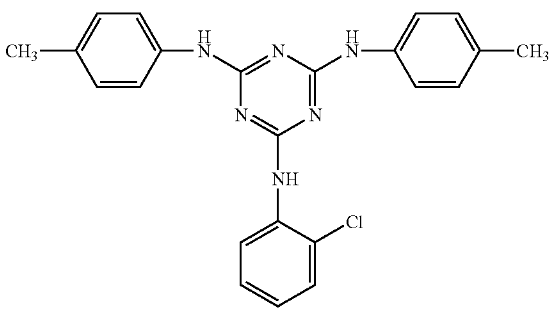
II-(5)
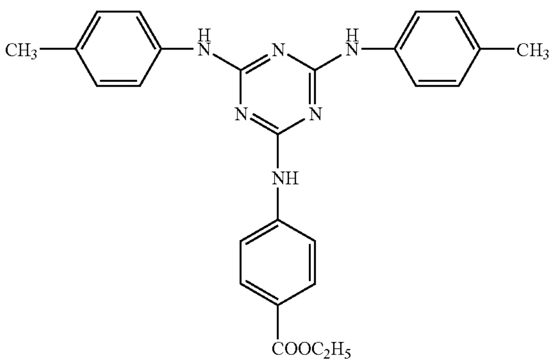
II-(6)
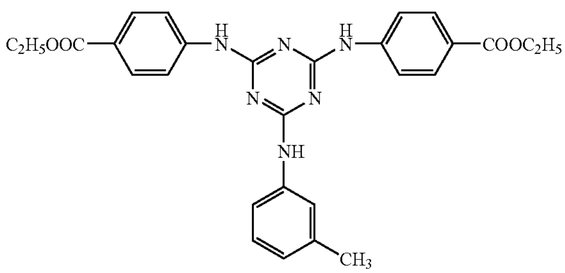
II-(7)
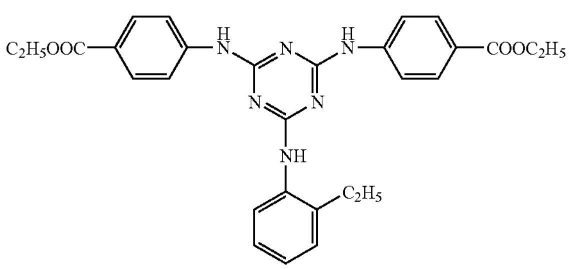
II-(8)
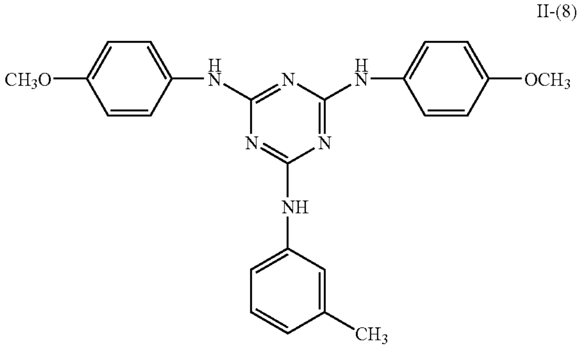
-continued
II-(9)
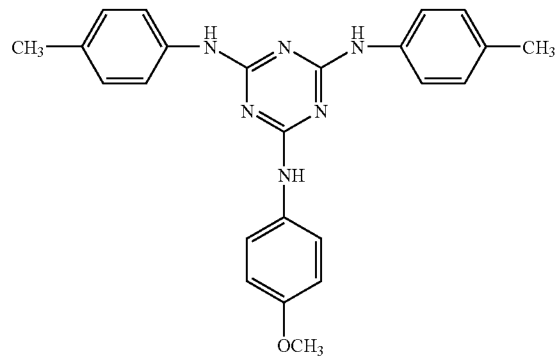
III-(1)
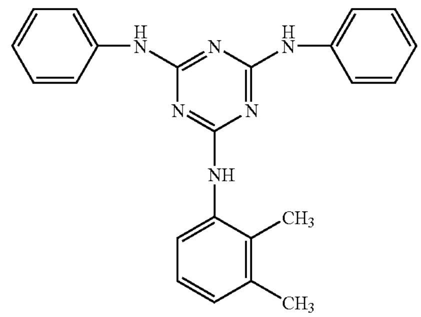
III-(2)
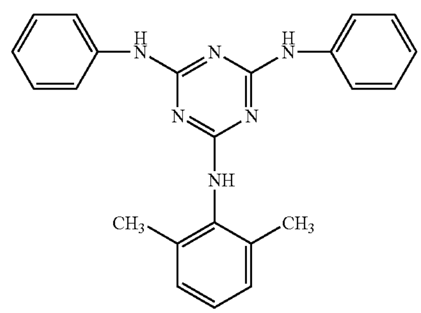
III-(3)
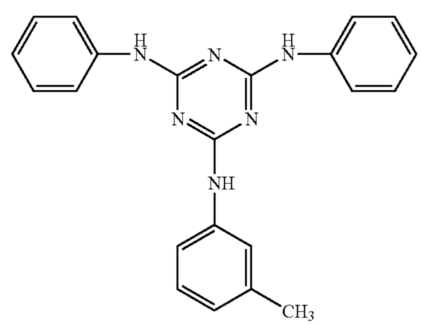
III-(4)
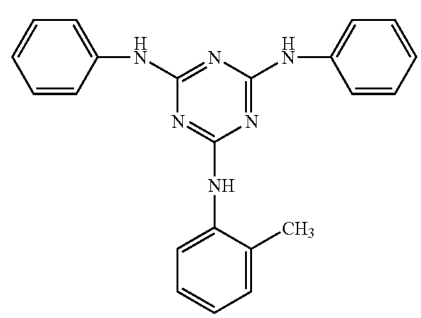

-continued
III-(5)
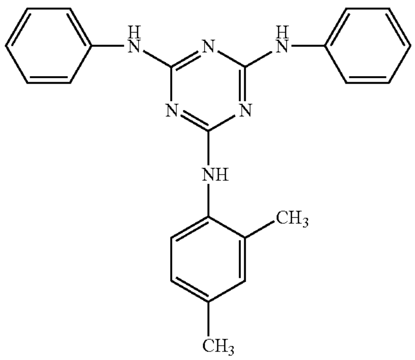
III-(6)
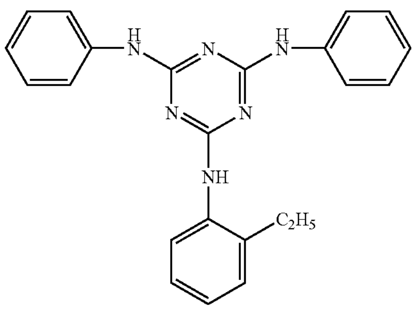
III-(7)
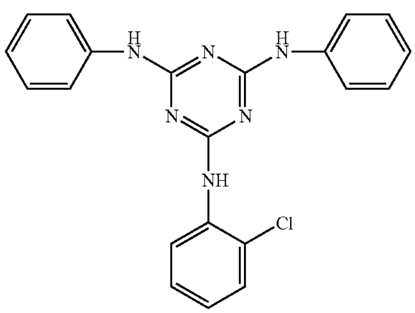
III-(8)
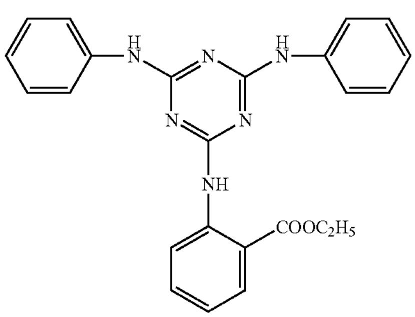
III-(9)
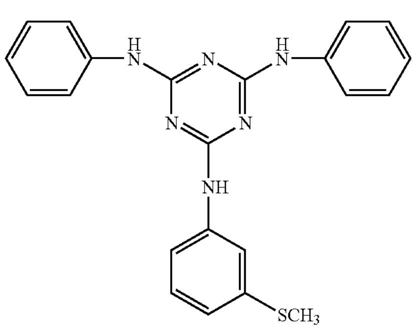
-continued
III-(10)
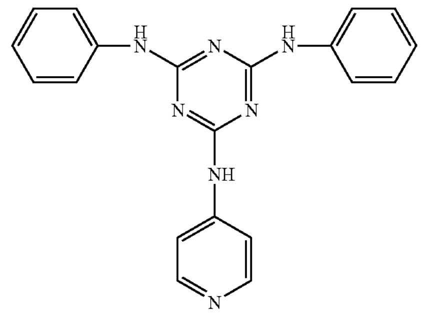
III-(11)
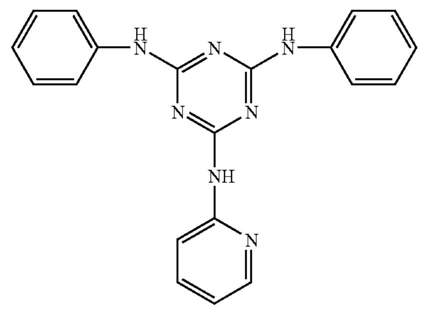
III-(12)
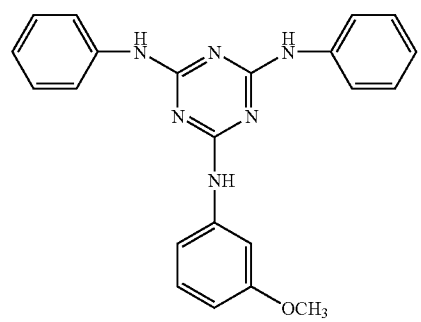
IV-(1)
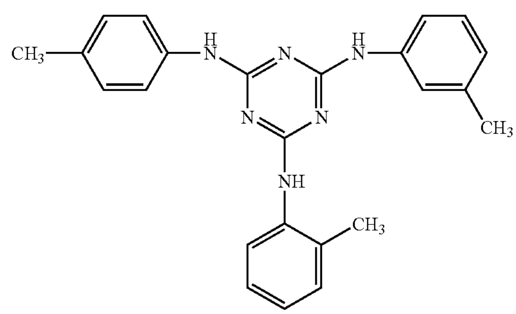
IV-(2)
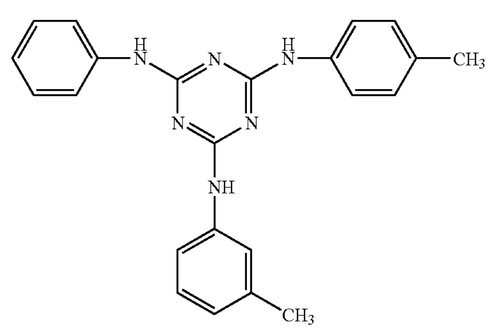

-continued

IV-(3)

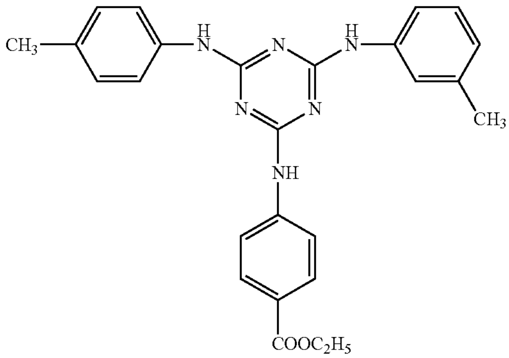

IV-(4)

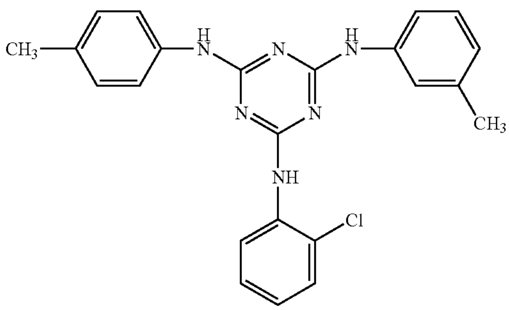

IV-(5)

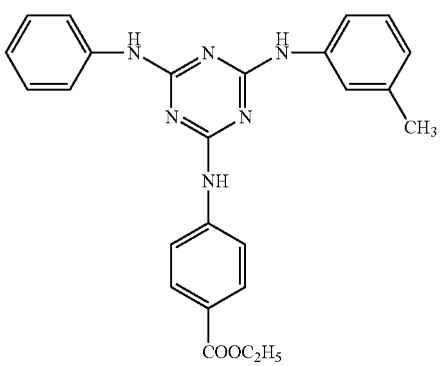

IV-(6)

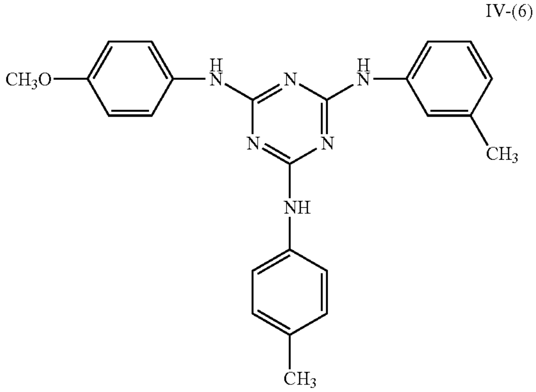

-continued

IV-(7)

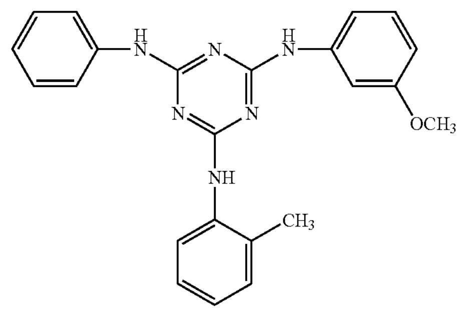

IV-(8)

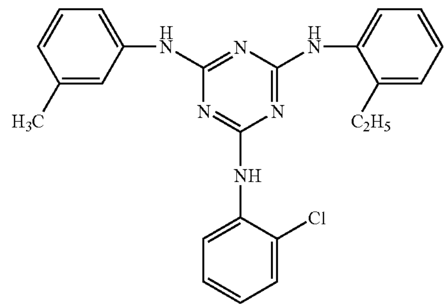

IV-(9)

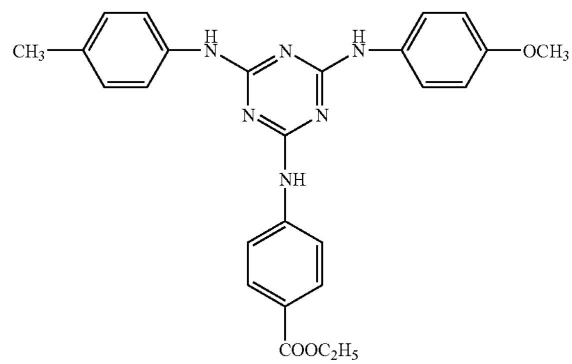

IV-(10)

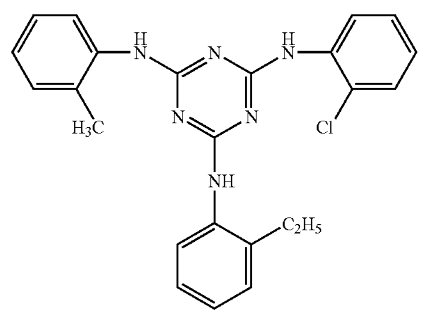

For improving the mechanical properties or promoting the drying rate, one or more plasticizers may be added to the cellulose acylate film to be used as the retardation film A or B. As the plasticizer, phosphates or carboxylates may be used. Examples of such phosphate include triphenyl phosphate (TPP) and tricresyl phosphate (TCP). Representative examples of such carboxylate are phthalic esters and citric esters. Examples of phthalic esters include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of citric esters include triethyl o-acetylcitrate (OACTE) and tributyl o-acetylcitrate (OACTB). Examples of other carboxylate include butyl oleate, methylacetyl ricinoleate, dibutyl sebacate, and various trimellitic esters. Phthalic ester type plasticizers (DMP, DEP, DBP, DOP, DPP, and DEHP) are preferably used. In particular, DEP and DPP are preferred.

The additive amount of a plasticizer is preferably 0.1 to 25 percent by mass, more preferably 1 to 20 percent by mass, and much more preferably 3 to 15 percent by mass with respect to the mass of the cellulose acylate.

A deterioration inhibitor (e.g., an antioxidizing agent, peroxide decomposer, radical inhibitor, metal inactivating agent, oxygen scavenger, or amine) may be added to the polymer film. Deterioration inhibitors are described in JPA Nos. hei 3-199201, hei 5-1907073, hei 5-194789, hei 5-271471, and hei 6-107854. The additive amount of the deterioration inhibitor is preferably 0.01 to 1 percent by mass, and more preferably 0.01 to 0.2 percent by mass of the solution (dope) to be prepared. When the additive amount is less than 0.01 percent by mass, the effect of the deterioration inhibitor is substantially unrecognizable. When the additive amount is in the excess of 1 percent by mass, the deterioration inhibitor may bleed out on the surface of the film. Butylated hydroxytoluene (BHT) and tribenzylamine (TBA) are particularly preferable deterioration inhibitors.

The cellulose acylate film may be stretched. The draw ratio in stretching is preferably from 3 to 100% or so. The stretching may be carried out by using a tenter. Or the stretching may be carried out by feeding a film between rolls.

In case where the cellulose acylate film is made to function also as a transparent protective film for polarizing films in addition to the function thereof as the retardation film, the cellulose acylate film is preferably surface-treated for enhancing its adhesiveness to polarizing elements.

The surface treatment includes corona discharge treatment, glow discharge treatment, flame treatment, acid treatment, alkali treatment or UV irradiation treatment. Preferred is acid treatment or alkali treatment; and more preferred is alkali treatment.

In the invention, the thickness of the retardation films A and B is preferably from 30 to 100 μm each, and more preferably from 40 to 80 μm each in terms of industrial manufacture.

One preferred embodiment of the invention is the liquid crystal display device, as described in the above, comprising the retardation films A and B, wherein the retardation film A, which is disposed on the displaying side, satisfies the above conditions (I) and (II) and the retardation film B, which is disposed on the backlight side, satisfies the above conditions (III) and (IV). Another preferred embodiment is the liquid crystal display device comprising the retardation films A and B, wherein both of the films satisfy the above conditions (V) and (VI), more preferably the above conditions (VII) and (VIII). Cycloolefin-based polymer films may achieve the optical properties required for the retardation film A to be used in these embodiments; and cellulose acylate films containing at least one liquid-crystal compound may achieve the optical properties required for the retardation film B to be used in these embodiments. Or cellulose acylate films containing at least one discotic compound having an absorption maximum within a wavelength range of from 250 nm to 380 nm may achieve the optical properties required for the retardation film A to be used in these embodiments; and cellulose acylate films containing at least one liquid-crystal compound may achieve the optical properties required for the retardation film B to be used in these embodiments.

[Polarizing Plate]

A polarizing plate fabricated by integrating a cellulose acylate film serving as the retardation film with a linear polarizing film (polarizing film) may be used in the liquid-crystal display device of the invention. The polarizing plate may be fabricated by laminating the retardation film and a linear polarizing film (unless otherwise specifically indicated, the "polarizing film" as referred to hereinunder means "linear polarizing film"). The cellulose acylate film for the retardation film may serve also as a protective film for the linear polarizing film.

The linear polarizing film is preferably a coated polarizing film typically by Optiva Inc., or a polarizing film comprising a binder, and iodine or a dichroic dye. Iodine and a dichroic die in the linear polarizing film express polarizability when aligned in a binder. Iodine and the dichroic dye preferably align along the binder molecules, or the dichroic dye preferably aligns in one direction as self-textured like liquid crystal. Polarizing elements that are now commercially available are generally fabricated by dipping a stretched polymer in a solution of iodine or a dichroic dye in a dyeing bath, whereby iodine or the dichroic dye is infiltrated into the binder.

On the surface of the linear polarizing film opposite to the surface thereof to which a retardation film has been stuck, a polymer film is preferably disposed (in a configuration of retardation film/polarizing film/polymer film).

Preferably, the polymer film has, as provided thereon, an antireflection film having soiling resistance and scratch resistance on its outermost surface. The antireflection film may be any conventional known one.

EXAMPLES

The invention is described more concretely with reference to the following Examples, in which the material, the reagent and the substance used, their amount and ratio, and the details of the treatment may be suitably modified or changed not overstepping the sprit and the scope of the invention. Accordingly, the invention should not be limited to the Examples mentioned below.

[Production of Film for Retardation Films A and B]

(Production of Cellulose Acylate Films 101 to 106)

The ingredients mentioned below were mixed in the ratio also mentioned below to prepare a cellulose acylate solution. The cellulose acylate solution was cast on a band, using a band caster, and the resulting web was peeled away from the band, stretched in TD (in the transverse direction perpendicular to the casting direction) by 20% at 140° C., then dried to produce a cellulose acylate film having a thickness of 60 μm. This was used as Film 101.

(Cellulose Acylate Solution)

| | |
|---|---|
| Cellulose acylate<br>(the degree of substitution with acetyl: 2.81) | 100 mas. pts. |
| Compound F-1 mentioned below | 5 mas. pts. |
| Triphenyl phosphate | 7 mas. pts. |
| Diphenyl phosphate | 4 mas. pts. |
| Methylene chloride | 418 mas. pts. |
| Methanol | 62 mas. pts. |

-continued

Compound F-1:

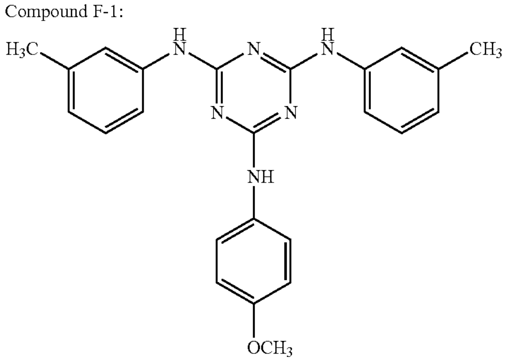

Film 102 was produced in the same manner as in the production of Film 101, except that the amount of Compound F-1 in the cellulose acylate solution was changed to 4 parts by mass and the draw ratio in stretching in TD was changed to 30%. The film had a thickness of 55 μm.

Film 103 was produced in the same manner as in the production of Film 101, except that the amount of Compound F-1 in the cellulose acylate solution was changed to 5 parts by mass and the TD stretching was attained at 160° C. by 50%. The film had a thickness of 50 μm.

Film 104 was produced in the same manner as in the production of Film 101, except that the amount of Compound F-1 in the cellulose acylate solution was changed to 5.3 parts by mass and the draw ratio in TD stretching was changed to 15%. The film had a thickness of 62 μm.

Film 106 was produced in the same manner as in the production of Film 101, except that the amount of Compound F-1 in the cellulose acylate solution was changed to 2 parts by mass. The film had a thickness of 60 μm.

The optical characteristics of the cellulose acylate films, Films 101 to 106, containing Compound F-1 are shown in the following Table.

TABLE 1

| Film No. | Material | Re (nm) | Rth (nm) | Re(446) − Re(548) (nm)<br>Rth(446) − Rth(548) (nm) |
|---|---|---|---|---|
| 101 | cellulose acylate | 45 | 130 | 1<br>2 |
| 102 | cellulose acylate | 55 | 120 | 1<br>2 |
| 103 | cellulose acylate | 60 | 115 | 1<br>1 |
| 104 | cellulose acylate | 30 | 135 | 1<br>3 |
| 105 | cellulose acylate | 30 | 105 | 1<br>2 |
| 106 | cellulose acylate | 30 | 80 | 0<br>1 |

(Production of Cellulose Acylate Films 201 to 206)

The ingredients mentioned below were mixed in the ratio also mentioned below to prepare a cellulose acylate solution. The cellulose acylate solution was cast on a band, using a band caster, and the resulting web was peeled away from the band, stretched in TD by 20% at 140° C., then dried to produce a cellulose acylate film having a thickness of 60 μm. This was used as Film 201.

(Cellulose Acylate Solution)

| | |
|---|---|
| Cellulose acylate<br>(the degree of substitution with acetyl: 2.81) | 100 mas. pts. |
| Compound F-1 mentioned above | 3 mas. pts. |
| Compound F-2 mentioned below | 2 mas. pts. |
| Compound F-3 mentioned below | 2 mas. pts. |
| Triphenyl phosphate | 7 mas. pts. |
| Diphenyl phosphate | 4 mas. pts. |
| Methylene chloride | 418 mas. pts. |
| Methanol | 62 mas. pts. |

Compound F-2:

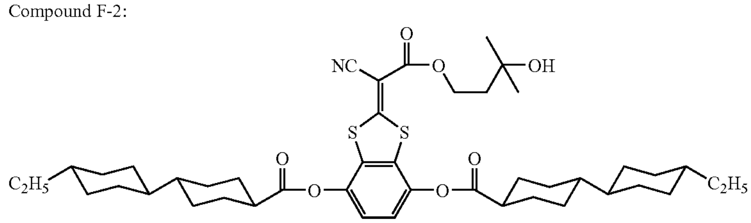

Compound F-3:

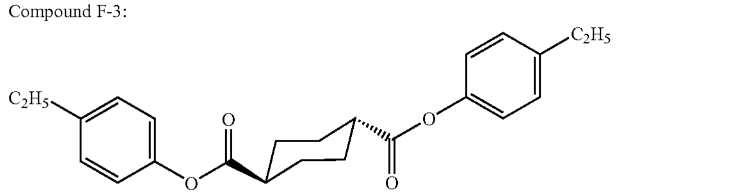

Film 105 was produced in the same manner as in the production of Film 101, except that the amount of Compound F-1 in the cellulose acylate solution was changed to 3 parts by mass and the draw ratio in I-D stretching was changed to 15%. The film had a thickness of 62 μm.

Film 202 was produced in the same manner as in the production of Film 201, except that the draw ratio in TD stretching was changed to 30%. The film had a thickness of 55 μm.

Film 203 was produced in the same manner as in the production of Film 201, except that the amount of Compound F-1 in the cellulose acylate solution was changed to 2 parts by mass and the TD stretching was changed to 35%. The film had a thickness of 53 μm.

Film 204 was produced in the same manner as in the production of Film 201, except that the amounts of Compound F-1 and Compound F-2 in the cellulose acylate solution were changed to 2 parts by mass and 5 parts by mass respectively, and the TD stretching was changed to 30%. The film had a thickness of 53 μm.

Film 205 was produced in the same manner as in the production of Film 201, except that the amount of Compound F-2 in the cellulose acylate solution was changed to 4 parts by mass and the TD stretching was changed to 30%. The film had a thickness of 53 μm.

Film 206 was produced in the same manner as in the production of Film 201, except that the amount of Compound F-1 in the cellulose acylate solution was changed to 5 parts by mass. The film had a thickness of 58 μm.

(Production of Cellulose Acylate Film 207)

The ingredients mentioned below were mixed in the ratio also mentioned below to prepare a cellulose acylate solution. The cellulose acylate solution was cast on a band, using a band caster, and the resulting web was peeled away from the band, stretched in TD by 20% at 170° C., then dried to produce a cellulose acylate film having a thickness of 60 μm. This was used as Film 207.

(Cellulose Acylate Solution)

| | |
|---|---|
| Cellulose acylate<br>(the degree of substitution with acetyl: 2.94) | 100 mas. pts. |
| Compound F-2 mentioned above | 6 mas. pts. |
| Compound F-3 mentioned above | 5 mas. pts. |
| Triphenyl phosphate | 3.5 mas. pts. |
| Diphenyl phosphate | 2 mas. pts. |
| Methylene chloride | 418 mas. pts. |
| Methanol | 62 mas. pts. |

The optical characteristics of the cellulose acylate films, Films 201 to 207, containing Compounds F-1, F-2 and F-3 are shown in the following Table.

TABLE 2

| Film No. | Material | Re (nm) | Rth (nm) | Re(446) − Re(548) (nm)<br>Rth(446) − Rth(548) (nm) |
|---|---|---|---|---|
| 201 | cellulose acylate | 50 | 120 | −3<br>−7 |
| 202 | cellulose acylate | 60 | 115 | −4<br>−8 |
| 203 | cellulose acylate | 70 | 105 | −6<br>−10 |
| 204 | cellulose acylate | 103 | 93 | −20<br>−18 |
| 205 | cellulose acylate | 80 | 118 | −16<br>−23 |
| 206 | cellulose acylate | 58 | 155 | −4<br>−8 |
| 207 | cellulose acylate | 74 | 155 | −12<br>−19 |

(Production of Cellulose Acylate Film 301)

The ingredients mentioned below were mixed in the ratio also mentioned below to prepare a cellulose acylate solution. The cellulose acylate solution was cast on a band, using a band caster, and the resulting web was peeled away from the band, stretched in TD by 20% at 140° C., then dried to produce a cellulose acylate film having a thickness of 40 μm. This was used as Film 301.

(Cellulose Acylate Solution)

| | |
|---|---|
| Cellulose acylate<br>(the degree of substitution with acetyl: 1.54 and the degree of substitution with propionyl: 0.84) | 100 mas. pts. |
| Compound F-1 mentioned above | 2 mas. pts. |
| Compound F-2 mentioned above | 1 mas. pts. |
| Compound F-3 mentioned above | 2 mas. pts. |
| Triphenyl phosphate | 4 mas. pts. |
| Diphenyl phosphate | 3 mas. pts. |
| Methylene chloride | 418 mas. pts. |
| Methanol | 62 mas. pts. |

The optical characteristics of Film 301 are shown in the following Table.

TABLE 3

| Film No. | Material | Re (nm) | Rth (nm) | Re(446) − Re(548) (nm)<br>Rth(446) − Rth(548) (nm) |
|---|---|---|---|---|
| 301 | cellulose acylate | 45 | 125 | −3<br>−6 |

(Production of Cellulose Acylate Film 401)

The ingredients mentioned below were mixed in the ratio also mentioned below to prepare a cellulose acylate solution. The cellulose acylate solution was cast on a band, using a band caster, and the resulting web was peeled away from the band, stretched in TD by 25% at 140° C., then dried to produce a cellulose acylate film having a thickness of 40 μm. This was used as Film 401.

(Cellulose Acylate Solution)

| | |
|---|---|
| Cellulose acylate<br>(the degree of substitution with acetyl: 1.54 and the degree of substitution with propionyl: 0.84) | 100 mas. pts. |
| Additive K-1 mentioned below | 5 mas. pts. |
| Additive K-2 mentioned below | 4 mas. pts. |
| Methylene chloride | 416 mas. pts. |
| Ethanol | 79 mas. pts. |

Additive K-1:

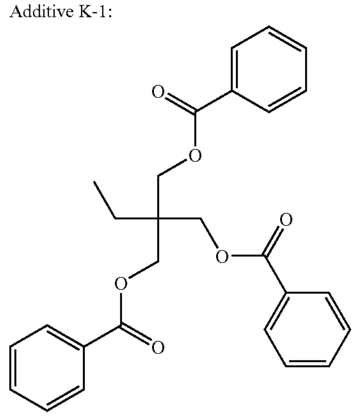

Additive K-2:

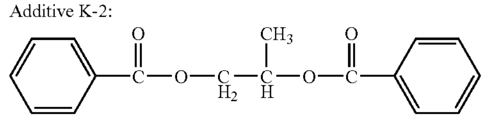

(Production of Cellulose Acylate Film 402)

The ingredients mentioned below were mixed in the ratio also mentioned below to prepare a cellulose acylate solution.

The cellulose acylate solution was cast on a band, using a band caster, and the resulting web was peeled away from the band, and stretched in TD by 35% at 140° C. TD means the direction orthogonal to the machine direction (MD). After thus stretched, this was dried to give a cellulose acylate film 402 having a thickness of 40 μm. This was used as Film 402.

(Cellulose Acylate Solution)

| | |
|---|---|
| Cellulose acylate (the degree of substitution with acetyl: 1.54 and the degree of substitution with propionyl: 0.84) | 100 mas. pts. |
| Additive K-1 mentioned above | 5 mas. pts. |
| Additive K-2 mentioned above | 4 mas. pts. |
| Compound F-2 mentioned above | 1.4 mas. pts. |
| Triphenyl phosphate | 3.5 mas. pts. |
| Diphenyl phosphate | 2 mas. pts. |
| Methylene chloride | 416 mas. pts. |
| Ethanol | 79 mas. pts. |

(Production of Cellulose Acylate Film 403)

A cellulose acylate film, Film 403, was produced in the same manner as in the production of Film 402, except that the draw ratio in TD stretching was changed to 25%. The film had a thickness of 40 μm.

The optical characteristics of the cellulose acylate films, Films 401 to 403, produced in the above are shown in the following Table.

TABLE 4

| Film No. | Material | Re (nm) | Rth (nm) | Re(446) − Re(548) (nm)<br>Rth(446) − Rth(548) (nm) |
|---|---|---|---|---|
| 401 | cellulose ester | 45 | 125 | −2<br>−5 |
| 402 | cellulose ester | 75 | 115 | −15<br>−20 |
| 403 | cellulose ester | 60 | 115 | −7<br>−11 |

[Production of Cycloolefin-Based Polymer Films 501 to 503]

A cycloolefin-based polymer film, "ZEONOR ZF-14" (by Nippon Zeon), was stretched in TD by 20% at 145° C. to produce Film 501. The film had a thickness of 83 μm.

A cycloolefin-based polymer film, "ZEONOR ZF-14" (by Nippon Zeon), was stretched in TD by 24% at 150° C. to produce Film 502. The film had a thickness of 80 μm.

A cycloolefin-based polymer film, "ZEONOR ZF-14" (by Nippon Zeon), was stretched in TD by 28% at 155° C. to produce Film 503. The film had a thickness of 78 μm.

TABLE 5

| Film No. | Material | Re (nm) | Rth (nm) | Re(446) − Re(548) (nm)<br>Rth(446) − Rth(548) (nm) |
|---|---|---|---|---|
| 501 | cycloolefin-based polymer | 40 | 125 | 0<br>0 |
| 502 | cycloolefin-based polymer | 50 | 120 | 0<br>0 |
| 503 | cycloolefin-based polymer | 60 | 115 | 0<br>0 |

[Production of Polarizing Plates 101 to 106, 201 to 206, 301, 401]

The surface of each of Films 101 to 106, 201 to 206, 301 and 401 produced in the above was saponified with alkali. Concretely, the film was dipped in an aqueous 1.5 N sodium hydroxide solution at 55° C. for 2 minutes, then washed in a rinsing bath at room temperature, and neutralized with 0.1 N sulfuric acid at 30° C. Again, this was washed in a rinsing bath at room temperature and dried in hot air at 100° C. Next, a polyvinyl alcohol film roll having a thickness of 80 μm was unrolled and continuously stretched by 5 times in an aqueous iodine solution, then dried to give a polarizing film having a thickness of 20 μm. Using an aqueous 3% polyvinyl alcohol (Kuraray's PVA-117H) solution as an adhesive, the alkali-saponified films 101 to 106, 201 to 206, 301 and 401, and a film Fujitac TD80UL (by FUJIFILM) also saponified with alkali in the same manner were prepared, and the former were individually combined with the latter and stuck together via a polarizing film sandwiched therebetween in a manner that the saponified surfaces of the two films faced the polarizing film, thereby fabricating Polarizing plates 101 to 106, 201 to 206, 301 and 401 in which the film and TD80UL were the protective films for the polarizing film.

[Production of Polarizing Plates 501 to 503]

The surface of each of the cycloolefin-based polymer films, Films 501 to 503, produced in the above was hydrophilicated through corona treatment. Then, the films were worked to produce polarizing plates in the same manner as that for the above-mentioned polarizing plates, Polarizing plates 101 to 106, 201 to 206, 301 and 401. Briefly, a commercially-available film, Fujitac TD80UL (by FUJIFILM), was saponified with alkali; and the previous films were individually combined with the saponified film, Fujitac TD80UL, and stuck together via a polarizing film sandwiched therebetween in a manner that the saponified surfaces of the two films faced the polarizing film, thereby fabricating polarizing plates 501 to 503 in which the film and TD80UL were the protective films for the polarizing film.

[Production of Liquid-Crystal Display Devices Nos. 1 to 20]

Using Polarizing plates 101 to 106, 201 to 206, 301, 401, and 501 to 503 produced in the above, liquid-crystal display devices Nos. 1 to 20 having the same constitution as shown in FIG. 1 were constructed. Concretely, a VA-mode liquid-crystal cell (Δnd=300 nm) was used as the liquid-crystal cell, and the polarizing plates were incorporated in the device on the displaying side and on the backlight side thereof (P1 and P2 in FIG. 1), thereby constructing the liquid-crystal display device as in the following Table showing the combination of the polarizing plates in each device. In the device, the slow axes of the retardation films were kept perpendicular to each other, as in FIG. 1.

(Evaluation)

Transmittance in the Black or White State:

The liquid-crystal display devices Nos. 1 to 20 constructed in the above were driven to measure the transmittance in the black or white state, in the front direction (in the normal line direction relative to the displaying plane) and in an oblique direction (in the direction at a polar angle of 60 degrees and an azimuth angle of 45 degrees), thereby to determine the front contrast and the oblique contrast thereof. The results of the oblique contrast are shown in the following Table.

Color Shift in the Black State:

The liquid-crystal display devices Nos. 1 to 20 constructed in the above were driven to measure the color shift in the black state, $\Delta u'v'$ ($=\sqrt{(u'max-u'min)^2+(v'max-v'min)^2}$). In this, u'max (v'max) means the largest u' (v') at an angle of from 0 to 360 degrees; and u'min (v'min) means the smallest u' (v') at an angle of from 0 to 360 degrees. The results are shown in the following Table.

TABLE 6

| Liquid-Crystal Display Device No. | Retardation Film (F) *1 | Retardation film (R) *2 | Difference in Re *3 (nm) | Difference in Rth *4 (nm) | Oblique CR | Color Shift | Remarks |
|---|---|---|---|---|---|---|---|
| 1 | Polarizing plate 501 | Polarizing plate 503 | −20 | 10 | 60 | 0.058 | the invention |
| 2 | Polarizing plate 501 | Polarizing plate 102 | −15 | 5 | 60 | 0.057 | the invention |
| 3 | Polarizing plate 501 | Polarizing plate 301 | −5 | 0 | 59 | 0.044 | the invention |
| 4 | Polarizing plate 501 | Polarizing plate 202 | −20 | 10 | 63 | 0.039 | the invention |
| 5 | Polarizing plate 101 | Polarizing plate 103 | −15 | 15 | 65 | 0.048 | the invention |
| 6 | Polarizing plate 101 | Polarizing plate 301 | 0 | 5 | 63 | 0.032 | the invention |
| 7 | Polarizing plate 101 | Polarizing plate 202 | −15 | 15 | 68 | 0.026 | the invention |
| 8 | Polarizing plate 101 | Polarizing plate 203 | −25 | 25 | 73 | 0.021 | the invention |
| 9 | Polarizing plate 301 | Polarizing plate 103 | −15 | 10 | 69 | 0.042 | the invention |
| 10 | Polarizing plate 301 | Polarizing plate 202 | −15 | 10 | 74 | 0.030 | the invention |
| 11 | Polarizing plate 201 | Polarizing plate 202 | −10 | 5 | 82 | 0.025 | the invention |
| 12 | Polarizing plate 104 | Polarizing plate 204 | −73 | 42 | 72 | 0.040 | the invention |
| 13 | Polarizing plate 105 | Polarizing plate 205 | −50 | −13 | 71 | 0.042 | the invention |
| 14 | Polarizing plate 106 | Polarizing plate 206 | −28 | −75 | 75 | 0.040 | the invention |
| 15 | Polarizing plate 401 | Polarizing plate 401 | 0 | 0 | 54 | 0.058 | comparative example |
| 16 | Polarizing plate 502 | Polarizing plate 502 | 0 | 0 | 58 | 0.052 | comparative example |
| 17 | Polarizing plate 103 | Polarizing plate 401 | 15 | −10 | 58 | 0.040 | the invention |
| 18 | Polarizing plate 105 | Polarizing plate 207 | −44 | −10 | 83 | 0.025 | the invention |
| 19 | Polarizing plate 105 | Polarizing plate 402 | −45 | −10 | 80 | 0.030 | the invention |
| 20 | Polarizing plate 401 | Polarizing plate 403 | −15 | 10 | 75 | 0.040 | the invention |

*1: Polarizing plate disposed on the displaying side
*2: Polarizing plate disposed on the backlight side
*3: Re(548) of front-side (panel-side) retardation film − Re(548) of backlight-side retardation film.
*4: Rth(548) of front-side (panel-side) retardation film − Rth(548) of backlight-side retardation film.

From the results shown in the above Table, it is understood that the liquid-crystal display devices Nos. 1 to 14 and 17 to 20 of Examples of the invention, having, on the displaying side and on the backlight side, retardation films that are different from each other in terms of optical anisotropy, all have a higher contrast in oblique directions, as compared with the liquid-crystal display devices Nos. 15 and 16 of Comparative Examples, having, on the displaying side and on the backlight side, retardation films that are same in terms of optical anisotropy.

In the liquid-crystal display devices Nos. 1 to 14 and 17 to 20, Δnd of the VA-mode liquid-crystal cell was changed to 290 nm, and the retardation film on the displaying side of each device was changed to a different film that differs from the original film in terms of Re and Rth but the retardation film on the backlight side was not changed. Thus modified, the liquid-crystal display devices had the same display characteristics as those of the original ones shown in the above Table.

What is claimed is:

1. A liquid crystal display device comprising: a liquid-crystal cell having a liquid-crystal layer that aligns vertically to the substrate thereof in the black state, first and second polarizing elements that are disposed to sandwich the liquid-crystal cell therebetween in a manner that their absorption axes are orthogonal to each other, an optically-biaxial retardation film A disposed between the first polarizing element and the liquid-crystal cell, and an optically-biaxial retardation film B disposed between the second polarizing element and the liquid-crystal cell, wherein the retardation films A and B differ from each other in the optical anisotropy and the retardation film A and the retardation film B satisfy the following conditions (V) and (VI):

$$Re_A(446)-Re_A(548)>Re_B(446)-Re_B(548) \quad (V)$$

$$Rth_A(446)-Rth_A(548)>Rth_B(446)-Rth_B(548) \quad (VI);$$

wherein $Re_A(\lambda)$ [nm] means retardation in plane of the retardation film A measured at a wavelength of λ [nm]; $Rth_A(\lambda)$ [nm] means retardation alone thickness direction of the retardation film A measured at a wavelength of λ [nm]; and similarly, $Re_B(\lambda)$ [nm] and $Rth_B(\lambda)$ [nm] each mean retardation in lane and retardation along thickness direction of the retardation film B measured at a wavelength of λ [nm].

2. The liquid-crystal display device of claim 1, wherein the retardation film A satisfies the following conditions (I) and (II), and the retardation film B satisfies the following conditions (III) and (IV):

$$20 \leqq Re_{(A)}(548) \leqq 65 \quad \text{(I)}$$

$$50 \leqq Rth_{(A)}(548) \leqq -2.5 \times Re_{(A)}(548)+300 \quad \text{(II)}$$

$$45 \leqq Re_{(B)}(548) \leqq 110 \quad \text{(III)}$$

$$50 \leqq Rth_{(B)}(548) \leqq -2.5 \times Re_{(B)}(548)+325 \quad \text{(IV)}$$

wherein $Re_{(A)}(\lambda)$ [nm] means retardation in plane of the retardation film A measured at a wavelength of $\lambda$ [nm]; $Rth_{(A)}(\lambda)$ [nm] means retardation along thickness direction of the retardation film A measured at a wavelength of $\lambda$ [nm]; and similarly, $Re_{(B)}(\lambda)$ [nm] and $Rth_{(B)}(\lambda)$ [nm] each mean retardation in plane and retardation along thickness direction of the retardation film B measured at a wavelength of $\lambda$ [nm].

3. The liquid-crystal display device of claim 1, wherein the retardation film A and the retardation film B satisfy the following conditions (VII) and (VIII):

$$Re_{(A)}(446)-Re_{(A)}(548)>0>Re_{(B)}(446)-Re_{(B)}(548) \quad \text{(VII)}$$

$$Rth_{(A)}(446)-Rth_{(A)}(548)>0>Rth_{(B)}(446)-Rth_{(B)}(548) \quad \text{(VIII).}$$

4. The liquid-crystal display device of claim 1, wherein at least one of the retardation films A and B is a cycloolefin-based polymer film.

5. The liquid-crystal display device of claim 1, wherein at least one of the retardation films A and B is a cellulose acylate film.

6. The liquid-crystal display device of claim 5, wherein the cellulose acylate film comprises a cellulose acylate having at least one acyl group selected from an acetyl group, a propionyl group and a butyryl group.

7. The liquid-crystal display device of claim 5, wherein the cellulose acylate film comprises a cellulose acylate having at least two acyl groups selected from an acetyl group, a propionyl group and a butyryl group.

8. The liquid-crystal display device of claim 4, wherein the cellulose acylate film comprises at least one discotic compound having an absorption peak at a wavelength falling within the range from 250 nm to 380 nm.

9. The liquid-crystal display device of claim 5, wherein the cellulose acylate film comprises at least one liquid crystal compound.

10. The liquid-crystal display device of claim 9, wherein said at least one liquid crystal compound is a compound represented by formula (A):

Formula (A)

Formula (A)

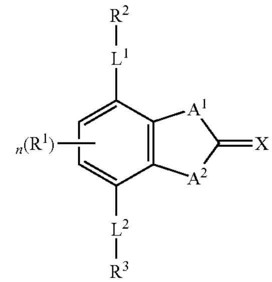

where $L^1$ and $L^2$ independently represent a single bond or a divalent linking group; $A^1$ and $A^2$ independently represent a group selected from the group consisting of —O—, —NR— where R represents a hydrogen atom or a substituent, —S— and —CO—; $R^1$, $R^2$ and $R^3$ independently represent a substituent; X represents a non-metal atom selected from the groups 14-16 atoms, provided that X may bind with at least one hydrogen atom or substituent; and n is an integer from 0 to 2.

11. The liquid-crystal display device of claim 9, wherein said at least one liquid crystal compound is a compound represented by formula (a):

$$Ar^1\text{-}L^2\text{-}X\text{-}L^3\text{-}Ar^2 \quad \text{Formula (a)}$$

where $Ar^1$ and $Ar^2$ independently represent an aromatic group; $L^2$ and $L^3$ independently represent —O—CO— or —CO—O—; and X represents 1,4-cyclohexylen, vinylene or ethynylene.

12. The liquid-crystal display device of claim 1, wherein the thickness of the retardation films A and B is from 30 to 100 μm each.

13. The liquid-crystal display device of claim 1, wherein at least one of the retardation films A and B is a stretched film.

14. The liquid-crystal display device of claim 1, wherein the retardation films A is a cycloolefin-based polymer film; and the retardation film B is a cellulose acylate film comprising at least one liquid crystal compound.

15. The liquid-crystal display device of claim 1, wherein the retardation films A is a cellulose acylate film comprising at least one discotic compound having an absorption peak at a wavelength falling within the range from 250 nm to 380 nm; and the retardation film B is a cellulose acylate film comprising at least one liquid crystal compound.

16. The liquid-crystal display device of claim 2, wherein the first polarizing element is disposed on the displaying side; and the second polarizing element is on the backlight side.

* * * * *